(12) United States Patent
Ohtsuka et al.

(10) Patent No.: US 12,229,598 B2
(45) Date of Patent: Feb. 18, 2025

(54) TASK EXECUTION SYSTEM FOR AUTONOMOUS ROBOT

(71) Applicants: Aiko Ohtsuka, Tokyo (JP); Koichi Kudo, Kanagawa (JP); Masuyoshi Yachida, Tokyo (JP); Hanako Bando, Kanagawa (JP)

(72) Inventors: Aiko Ohtsuka, Tokyo (JP); Koichi Kudo, Kanagawa (JP); Masuyoshi Yachida, Tokyo (JP); Hanako Bando, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 435 days.

(21) Appl. No.: 17/488,309

(22) Filed: Sep. 29, 2021

(65) Prior Publication Data

US 2022/0100571 A1   Mar. 31, 2022

(30) Foreign Application Priority Data

Sep. 30, 2020  (JP) ................................ 2020-165652
Jun. 4, 2021   (JP) ................................ 2021-094711

(51) Int. Cl.
*G06F 9/50* (2006.01)
*H04B 1/38* (2015.01)

(52) U.S. Cl.
CPC ............. *G06F 9/5027* (2013.01); *H04B 1/38* (2013.01)

(58) Field of Classification Search
None
See application file for complete search history.

(56) References Cited

U.S. PATENT DOCUMENTS

| 5,991,510 A * | 11/1999 | Beaulieu ............. G05B 19/409 |
| | | 700/250 |
| 9,733,646 B1 * | 8/2017 | Nusser ................... B65G 1/137 |
| 10,168,682 B1 * | 1/2019 | McDaniel ......... H02J 13/00034 |
| 10,493,625 B2 | 12/2019 | Haddadin |

(Continued)

FOREIGN PATENT DOCUMENTS

| CN | 110809745 A | 2/2020 |
| CN | 111399511 A | 7/2020 |

(Continued)

OTHER PUBLICATIONS

Office Action issued Mar. 23, 2022 in Japanese Patent Application No. 2021-094711, 3 pages.

(Continued)

*Primary Examiner* — Adam Lee
(74) *Attorney, Agent, or Firm* — XSENSUS LLP

(57) ABSTRACT

A scheduling system includes first circuitry and second circuitry. The first circuitry stores, in a memory, information on a plurality of tasks to be executed by at least one mobile device. The information on the plurality of tasks includes information on an estimated amount of battery consumption of the at least one mobile device in executing each of the plurality of tasks. The second circuitry receives designation of the plurality of tasks to be executed by the at least one mobile device. The second circuitry further causes a display to display a screen having a schedule in which the plurality of tasks is arranged for the at least one mobile device based on the information on the estimated amount of battery consumption.

17 Claims, 29 Drawing Sheets

(56) References Cited

U.S. PATENT DOCUMENTS

| | | | |
|---|---|---|---|
| 11,400,823 B1* | 8/2022 | Sampath | B60L 58/12 |
| 2002/0073160 A1* | 6/2002 | Purcell | G06F 16/958 |
| | | | 707/E17.116 |
| 2003/0212472 A1* | 11/2003 | McKee | G05D 1/0274 |
| | | | 318/568.12 |
| 2008/0109114 A1 | 5/2008 | Orita et al. | |
| 2009/0055520 A1* | 2/2009 | Tabata | G06F 1/3221 |
| | | | 713/300 |
| 2010/0217438 A1 | 8/2010 | Kawaguchi et al. | |
| 2012/0317432 A1* | 12/2012 | Assad | G06F 1/3212 |
| | | | 713/340 |
| 2013/0082526 A1* | 4/2013 | Lee | H02J 3/14 |
| | | | 307/31 |
| 2013/0166133 A1* | 6/2013 | Ikeda | B25J 9/0003 |
| | | | 901/1 |
| 2013/0262891 A1* | 10/2013 | Gudlavenkatasiva | |
| | | | G06F 1/3212 |
| | | | 713/320 |
| 2018/0144272 A1* | 5/2018 | Moroo | G06F 1/3203 |
| 2018/0196490 A1* | 7/2018 | Ail | G06F 1/3287 |
| 2019/0196565 A1* | 6/2019 | Shimamura | G06F 1/329 |
| 2019/0202048 A1* | 7/2019 | Tarbaieva | B65G 1/0492 |
| 2020/0210119 A1 | 7/2020 | Shinchi | |
| 2020/0257350 A1* | 8/2020 | Suzuki | G06F 1/3228 |
| 2020/0257605 A1* | 8/2020 | Suzuki | G06F 11/3006 |
| 2020/0301738 A1* | 9/2020 | Suzuki | G06F 1/28 |
| 2020/0310874 A1* | 10/2020 | Shiraishi | G06F 1/329 |
| 2020/0319640 A1 | 10/2020 | Vogel et al. | |
| 2020/0379533 A1* | 12/2020 | Suzuki | G06F 9/4893 |
| 2021/0001487 A1 | 1/2021 | Ohtsuka et al. | |
| 2021/0031360 A1* | 2/2021 | Koga | B25J 9/0084 |
| 2021/0037214 A1 | 2/2021 | Itoh | |
| 2021/0069901 A1* | 3/2021 | Oda | G05D 1/0217 |

FOREIGN PATENT DOCUMENTS

| | | |
|---|---|---|
| JP | 2002-182747 A | 6/2002 |
| JP | 2002-278625 A | 9/2002 |
| JP | 2005-324278 | 11/2005 |
| JP | 2006-106919 A | 4/2006 |
| JP | 2006-150562 A | 6/2006 |
| JP | 2009-145942 A | 7/2009 |
| JP | 2012-063961 A | 3/2012 |
| JP | 2013-156800 A | 8/2013 |
| JP | 2020-104306 A | 7/2020 |
| JP | 2021-027390 | 2/2021 |
| WO | 2018/197665 A1 | 11/2018 |

OTHER PUBLICATIONS

Office Action issued on Jun. 30, 2023, in corresponding Chinese patent Application No. 202111143963.3, 11 pages.

Office Action issued on Oct. 19, 2021, in corresponding Japanese patent Application No. 2021-094711, 3 pages.

Extended European search report issued on Feb. 23, 2022, in corresponding European patent Application No. 21199152.6, 12 pages.

Milan Tomy et al., "Battery charge scheduling in long-life autonomous mobile robots via multi-objective decision making under uncertainty", Robotics and Autonomous Systems, vol. 133, Sep. 4, 2020, total 17 pages.

* cited by examiner

FIG. 7

| USER ID | PASSWORD |
|---------|----------|
| w001 | aaaa |
| w002 | abab |
| w003 | baba |
| ... | ... |

FIG. 8

USER ID : w001

| TASK ID | TASK NAME | TIME INFORMATION | | POSITION INFORMATION | ESTIMATED AMOUNT OF BATTERY CONSUMPTION | PROCESSING INFORMATION |
| --- | --- | --- | --- | --- | --- | --- |
| | | START TIME | EXECUTION TIME | | | |
| A1 | TANK A1 | 9:00 | 10 MIN | (35.4579452, 139.3886651) | 6% | CAPTURE IMAGE |
| A2 | PLANT A WEST | – | 5 MIN | (35.4579472, 139.3886701) | 4% | CAPTURE IMAGE |
| A3 | TANKER A | 11:04 | 2 H | (35.4579413, 139.3886761) | 66% | CAPTURE IMAGE, DETECT ODOR, DETECT GAS |
| A4 | TANK A2 | – | 3 MIN | (35.4579461, 139.3886761) | 2% | CAPTURE IMAGE |
| A5 | ODOR IN SITE | – | 3 H | ALL AROUND SITE | 70% | DETECT ODOR, DETECT GAS |
| ⋮ | ⋮ | ⋮ | ⋮ | ⋮ | ⋮ | ⋮ |

FIG. 9

| ROBOT ID | ROBOT NAME | POSITION INFORMATION | AMOUNT OF BATTERY REMAINING (%) |
|---|---|---|---|
| R1 | ROBOT NO. 1 | (35.4579457,139.3886619) | 75 |
| R2 | ROBOT NO. 2 | (35.4579457,139.3886793) | 47 |
| ... | ... | ... | ... |

FIG. 10

| REFERENCE POINT 1 | REFERENCE POINT 2 | ESTIMATED AMOUNT OF BATTERY CONSUMPTION | TRAVEL TIME |
|---|---|---|---|
| P0 (35.4579413, 139.3886605) | P1 (35.4579452, 139.3886651) | 5% | 4 MIN |
| P0 (35.4579413, 139.3886605) | P2 (35.4579472, 139.3886701) | 7% | 6 MIN |
| P0 (35.4579413, 139.3886605) | P3 (35.4579413, 139.3886761) | 4% | 3 MIN |
| P0 (35.4579413, 139.3886605) | P4 (35.4579461, 139.3886761) | 6% | 5 MIN |
| P1 (35.4579452, 139.3886651) | P2 (35.4579472, 139.3886701) | 4% | 3 MIN |
| P1 (35.4579452, 139.3886651) | P4 (35.4579461, 139.3886761) | 7% | 6 MIN |
| P2 (35.4579472, 139.3886701) | P3 (35.4579413, 139.3886761) | 12% | 11 MIN |
| P2 (35.4579472, 139.3886701) | P4 (35.4579461, 139.3886761) | 4% | 3 MIN |
| P3 (35.4579413, 139.3886761) | P4 (35.4579461, 139.3886761) | 8% | 5 MIN |
| ... | ... | ... | ... |

FIG. 11

| USER ID; w001 | | |
|---|---|---|
| TIME | TASK ID | ROBOT ID |
| 9:20-9:30 | A1 | R1 |
| 9:35-9:40 | A2 | R1 |
| 9:43-9:46 | A4 | R1 |
| 11:04-13:04 | A3 | R1 |
| ... | ... | ... |

FIG. 16

ARRANGEMENT PATTERN A

1) FINAL AMOUNT OF BATTERY REMAINING: 20
2) MINIMUM ESTIMATED AMOUNT OF BATTERY REMAINING: 20
3) THE NUMBER OF REPLACEMENT TIMES: 0
4) TOTAL AMOUNT OF MOVEMENT: 360
5) END TIME: 13:04

ARRANGEMENT PATTERN B

1) FINAL AMOUNT OF BATTERY REMAINING: 20
2) MINIMUM ESTIMATED AMOUNT OF BATTERY REMAINING: 20
3) THE NUMBER OF REPLACEMENT TIMES: 0
4) TOTAL AMOUNT OF MOVEMENT: 420
5) END TIME: 13:04

ARRANGEMENT PATTERN C

1) FINAL AMOUNT OF BATTERY REMAINING: 15
2) MINIMUM ESTIMATED AMOUNT OF BATTERY REMAINING: 15
3) THE NUMBER OF REPLACEMENT TIMES: 0
4) TOTAL AMOUNT OF MOVEMENT: 540
5) END TIME: 13:22

ARRANGEMENT PATTERN D

1) FINAL AMOUNT OF BATTERY REMAINING: 11
2) MINIMUM ESTIMATED AMOUNT OF BATTERY REMAINING: 11
3) THE NUMBER OF REPLACEMENT TIMES: 0
4) TOTAL AMOUNT OF MOVEMENT: 700
5) END TIME: 13:41

FIG. 18

SCHEDULE LIST

ID: w001

TODAY: 2020/9/15

| SCHEDULED START TIME SCHEDULED END TIME | TASK NAME | ROBT NAME | | |
|---|---|---|---|---|
| 9:20 – 9:30 | TANK A1 | ROBOT NO. 1 | UNCOMPLETED | 810a |
| 9:35 – 9:40 | PLANT A WEST | ROBOT NO. 1 | UNCOMPLETED | 810b |
| 9:43 – 9:46 | TANKER A | ROBOT NO. 1 | UNCOMPLETED | 810c |
| 11:04 – 13:04 | TANK A2 | ROBOT NO. 1 | UNCOMPLETED | 810d |

...

MODIFY  820

| SETTING ID | SETTING NAME | ARRANGEMENT SETTING DETAIL |
|---|---|---|
| c001 | BATTERY REMAINING PRIORITY | FINAL AMOUNT OF BATTERY REMAINING> ESTIMATED AMOUNT OF BATTERY REMAINING> REPLACEMENT TIMES>TOTAL AMOUNT OF MOVEMENT>END TIME |
| c002 | REPLACEMENT TIMES PRIORITY | REPLACEMENT TIMES>FINAL AMOUNT OF BATTERY REMAINING> ESTIMATED AMOUNT OF BATTERY REMAINING> TOTAL AMOUNT OF MOVEMENT>END TIME |
| c003 | MOVEMENT AMOUNT PRIORITY | TOTAL AMOUNT OF MOVEMENT>FINAL AMOUNT OF BATTERY REMAINING> ESTIMATED AMOUNT OF BATTERY REMAINING>REPLACEMENT TIMES> END TIME |
| c004 | END TIME PRIORITY | END TIME>FINAL AMOUNT OF BATTERY REMAINING> ESTIMATED AMOUNT OF BATTERY REMAINING>REPLACEMENT TIMES> TOTAL AMOUNT OF MOVEMENT |
| ... | ... | ... |

FIG. 26A

| REFERENCE POINT 1 | REFERENCE POINT 2 | ENVIRONMENT CONDITION | ESTIMATED AMOUNT OF BATTERY CONSUMPTION | TRAVEL TIME |
|---|---|---|---|---|
| P0 (35.4579413, 139.3886605) | P1 (35.4579452, 139.3886651) | SUNNY | 5% | 4 MIN |
| | | CLOUDY | 5% | 4 MIN |
| | | RAINY | 8% | 8 MIN |
| | | SNOWY | 15% | 15 MIN |
| ... | ... | ... | ... | ... |

FIG. 26B

| REFERENCE POINT 1 | REFERENCE POINT 2 | ENVIRONMENT CONDITION | ESTIMATED AMOUNT OF BATTERY CONSUMPTION | TRAVEL TIME |
|---|---|---|---|---|
| P0 (35.4579413, 139.3886605) | P1 (35.4579452, 139.3886651) | PRESENCE OF CONSTRUCTION | 8% | 6 MIN |
| | | NO CONSTRUCTION | 5% | 4 MIN |
| ... | ... | ... | ... | ... |

FIG. 26C

| REFERENCE POINT 1 | REFERENCE POINT 2 | ENVIRONMENT CONDITION | ESTIMATED AMOUNT OF BATTERY CONSUMPTION | TRAVEL TIME |
|---|---|---|---|---|
| P0 (35.4579413, 139.3886605) | P1 (35.4579452, 139.3886651) | AM | 5% | 4 MIN |
| | | PM | 8% | 6 MIN |
| ... | ... | ... | ... | ... |

TASK EXECUTION SYSTEM FOR AUTONOMOUS ROBOT

CROSS-REFERENCE TO RELATED APPLICATION

This patent application is based on and claims priority pursuant to 35 U.S.C. § 119(a) to Japanese Patent Application Nos. 2020-165652, filed on Sep. 30, 2020, and 2021-094711, filed on Jun. 4, 2021, in the Japan Patent Office, the entire disclosures of which are hereby incorporated by reference.

BACKGROUND

Technical Field

Embodiments of the present disclosure relate to a scheduling system, a scheduling method, and a non-transitory recording medium.

Related Art

Robots each of which is installed at a site such as a factory or a warehouse and autonomously moves within the site are known. Such a robot is used as, for example, an inspection robot or a service robot, and executes tasks such as inspection of facilities in the site in alternative to a worker.

In addition, for example, registering a periodic task schedule to cause such a robot to execute the tasks in alternative to the worker in advance allows the robot to automatically start executing each of the tasks at a registered time. As a scheduling method of arranging such the tasks to be executed by such the robot, for example, a method of generating schedule data including data on the tasks to be executed by the robot based on data on priority related to the tasks is known

SUMMARY

An exemplary embodiment of the present disclosure includes a scheduling system including first circuitry and second circuitry. The first circuitry stores, in a memory, information on a plurality of tasks to be executed by at least one mobile device. The information on the plurality of tasks includes information on an estimated amount of battery consumption of the at least one mobile device in executing each of the plurality of tasks. The second circuitry receives designation of the plurality of tasks to be executed by the at least one mobile device. The second circuitry further causes a display to display a screen having a schedule in which the plurality of tasks is arranged for the at least one mobile device based on the information on the estimated amount of battery consumption.

Another embodiment of the present disclosure includes a scheduling method including receiving designation of a plurality of tasks to be executed by at least one mobile device in relation to which information on an estimated amount of battery consumption in executing each of the plurality of tasks is stored in a memory. The method further includes displaying a screen having a schedule in which the plurality of tasks is assigned to the at least one mobile device based on the information on the estimated amount of battery consumption.

Another embodiment of the present disclosure includes a non-transitory recording medium storing a plurality of instructions which, when executed by one or more processors, causes the processors to perform a method. The method includes receiving designation of a plurality of tasks to be executed by at least one mobile device in relation to which information on an estimated amount of battery consumption in executing each of the plurality of tasks is stored in a memory. The method further includes displaying a screen having a schedule in which the plurality of tasks is assigned to the at least one mobile device based on the information on the estimated amount of battery consumption.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 1 is a diagram illustrating an example of an overall configuration of a scheduling system, according to one of embodiments of the disclosure;

FIG. 2 is a diagram schematically illustrating an example of a target site where a robot is installed, according to the one of the embodiments of the disclosure;

FIG. 3 is a diagram illustrating an example of a schematic configuration of the robot according to the one of the embodiments of the disclosure;

FIG. 4 is a block diagram illustrating an example of a hardware configuration of the robot according to the one of the embodiments of the disclosure;

FIG. 5 is a block diagram illustrating an example of a hardware configuration of one of a schedule management server and a communication terminal according to the one of the embodiments of the disclosure;

FIG. 6 is a block diagram illustrating an example of the functional configuration of the scheduling system according to the one of the embodiments of the disclosure;

FIG. 7 is a conceptual diagram illustrating an example of an authentication information management table, according the one of the embodiments of the disclosure;

FIG. 8 is a conceptual diagram illustrating an example of a task information management table, according to the one of the embodiments of the disclosure;

FIG. 9 is a conceptual diagram illustrating an example of a state information management table, according to the one of the embodiments of the disclosure;

FIG. 10 is a conceptual diagram illustrating an example of a movement information management table, according to the one of the embodiments of the disclosure;

FIG. 11 is a conceptual diagram illustrating an example of a schedule management table, according to the one of the embodiments of the disclosure;

FIG. 12 is a sequence diagram illustrating an example of a schedule registration process, according to the one of the embodiments of the disclosure;

FIG. 13 is a diagram illustrating an example of a task designation screen displayed on the communication terminal according to the one of the embodiments of the disclosure;

FIG. 14 is a flowchart illustrating an example of processing of schedule registration performed by the schedule management server according to the one of the embodiments of the disclosure;

FIG. 15A and FIG. 15B (FIG. 15) are a flowchart illustrating an example of a pattern identifying process performed by an identifying unit according to the one of the embodiments of the disclosure;

FIG. 16 is a diagram for explaining an example of a plurality of arrangement patterns generated by a generating unit and a value corresponding to a specific condition in each arrangement pattern, according to the one of the embodiments of the disclosure;

FIG. 18 is a diagram illustrating an example of a schedule checking screen according to the one of the embodiments of the disclosure;

FIG. 23 is a conceptual diagram illustrating an example of a specific condition management table, according to the one of the embodiments of the disclosure;

FIG. 26A to FIG. 26C (FIG. 26) are conceptual diagrams each illustrating a modification of the movement information management table according to the one of the embodiments of the disclosure;

Figure 1:
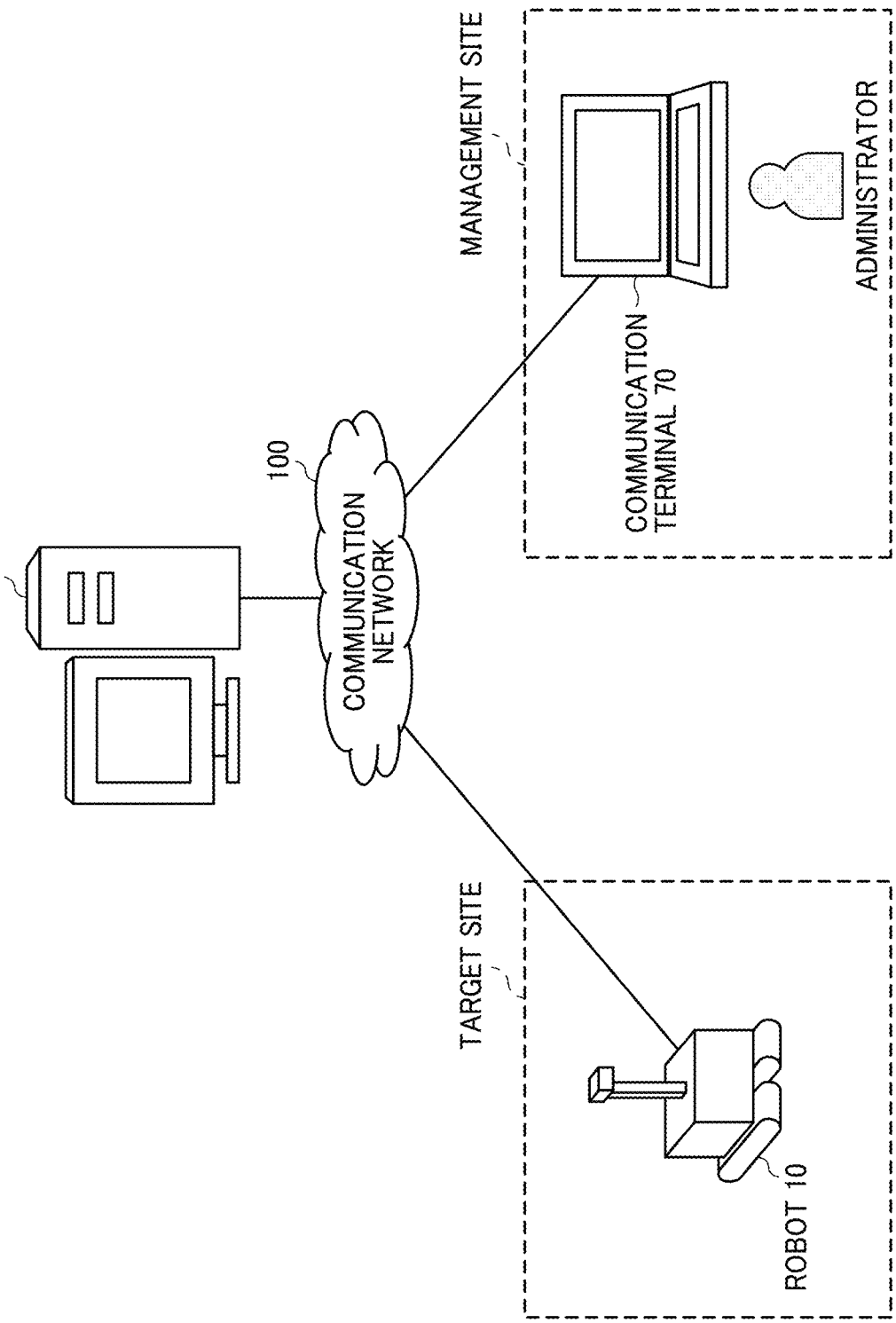

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments of the present disclosure are described with reference to the drawings. In the description of the drawings, the same elements are denoted by the same reference numerals, and redundant descriptions thereof are omitted.

Embodiment

System Configuration:

FIG. 1 is a diagram illustrating an example of an overall configuration of a scheduling system, according to an embodiment of the disclosure. A scheduling system 1 illustrated in FIG. 1 is a system for scheduling for executing inspection work in relation to one or more inspection target objects installed at a target site using a robot 10.

The scheduling system 1 includes the robot 10 placed at a predetermined site, a schedule management server 50, and a communication terminal 70. The robot 10, the schedule management server 50, and the communication terminal 70 included in the scheduling system 1 communicates with each other via a communication network 100. The communication network 100 includes, for example, the Internet, a mobile communication network, a local area network (LAN). The communication network 100 includes a network by not only wired communications but also a network by wireless communications such as 3rd generation (3G), 4th generation (4G), 5th generation (5G), Wireless Fidelity (registered trademark) (Wi-Fi), Worldwide Interoperability for Microwave Access (WiMAX) or Long Term Evolution (LTE).

The robot 10 is a mobile device that is installed at the target site and autonomously moves, or travels, in the target site. The robot 10 executes inspection work (inspection tasks) in relation to the one or more inspection target objects installed or placed at the target site while moving, or traveling, in the target site. The robot 10 further transmits, to the communication terminal 70 used by an administrator of the target site, an inspection result such as a captured image captured according to an inspection task, thereby providing information (ex. an image) indicating the inspection result to the administrator.

The schedule management server 50 is a server computer for managing a schedule for causing the robot 10 to execute the inspection tasks in relation to the one or more inspection target objects installed or placed at the target site. The schedule management server 50 registers and manages a schedule for executing one or more specified or designated inspection tasks by performing processing of schedule registration, which is described later, according to a request from the communication terminal 70 used by the administrator.

The schedule management server 50 may be configured by a single computer or a plurality of computers to which divided portions (functions) are arbitrarily allocated. All or a part of the functions of the schedule management server 50 may be implemented by a server computer in a cloud environment or a server computer in an on-premises environment.

The communication terminal 70 is a computer such as a notebook personal computer (PC), and is used by the administrator who manages the inspection tasks to be executed at the target site, the one or more inspection target objects installed or placed at the target site, or the robot 10 installed at the target site. The administrator manages the schedule of the inspection tasks or checks results obtained by executing the inspection tasks at a management site such as an office. The administrator may further remotely operate the robot 10 while watching an image of the target site displayed on the communication terminal 70. The communication terminal 70 is not limited to the notebook PC, and may be, for example, a desktop PC, a tablet terminal, a smartphone, or a wearable terminal.

Figure 2:
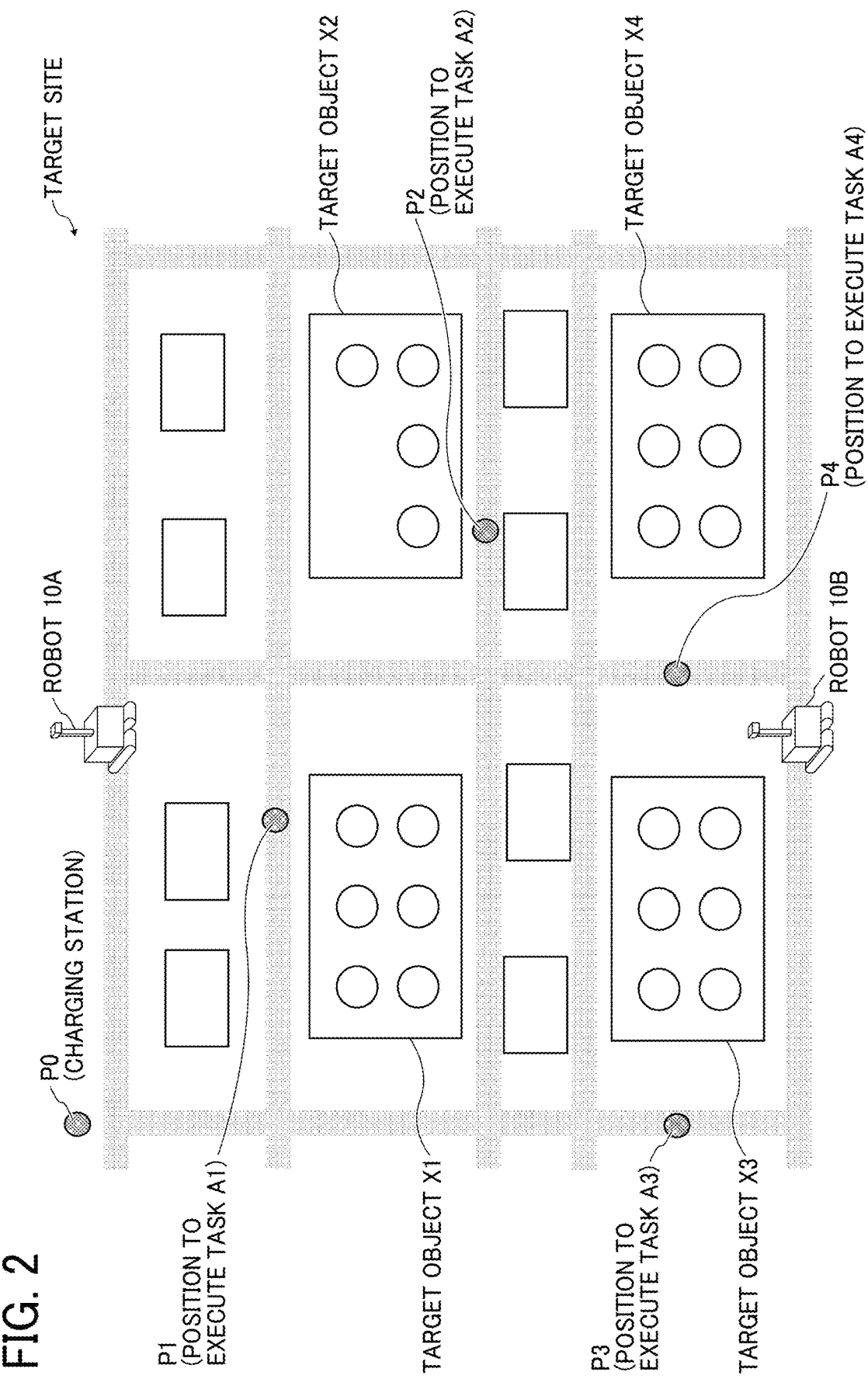

Overview:

A description is given below of the target site where the robot 10 is installed, with reference to FIG. 2. FIG. 2 is a diagram schematically illustrating an example of a target site where a robot is installed, according to the present embodiment. Referring to FIG. 2, two robots 10A and 10B are installed at the target site. The example of the target site illustrated in FIG. 2 is an outdoor facility having a large site area such as a plant factory. There are a plurality of target objects X1, X2, X3, and X4 that require maintenance management such as daily inspection or periodic inspection in the target site illustrated in FIG. 2. For example, when the target site is a plant factory, the target object for the inspection is a measurement meter of a storage tank or a tanker that carries the storage tank. In addition, the target object may include a certain area in the target site.

In order to execute the inspection tasks assigned by the schedule management server 50, each of the robots 10A and 10B autonomously moves, or travels, within the target site and executes each inspection task at a predetermined position. The robots 10A and 10B may move, or travel, within the target site using a technology such as line tracing or remote control from the communication terminal 70. In addition, a charging station for charging a battery of each of the robots 10A and 10B is provided at a position P0 in the target site.

In the example of FIG. 2, in order to execute an inspection task in relation to the target object X1, the robots 10A and 10B move, or travel, to a position P1 and execute the inspection task in relation to the target object X1. The robots 10A and 10B further move, or travel, to a position P2 and execute an inspection task in relation to the target object X2. The robots 10A and 10B further move, or travel, to a position P3 and execute an inspection task in relation to the target object X3. The robots 10A and 10B further move, or travel, to a position P4 and execute an inspection task in relation to the target object X4.

In a conventional method in which a robot executes tasks in alternative to a worker, the tasks to be executed by the robot are scheduled without taking into account change in condition (state), such as battery consumption, of the robot that is to execute the tasks. Due to this, the operation of the robot may stop during the execution of the tasks, which results in failing to complete the tasks requested by the administrator, for example. In addition, in a conventional technology, the tasks to be executed by the robot are scheduled on the assumption that a start time of executing each task is determined, or fixed, in advance. That is, when the tasks include both of one that has a fixed start time and another one that does not have a fixed start time, the tasks are failed to be scheduled.

The scheduling system 1 according to the present embodiment sets an executable schedule for the robot 10, which is to execute the inspection tasks specified or designated by the administrator, based on an estimated amount of battery consumption in executing the inspection tasks and registers the schedule. In addition, even in a case where there are an inspection task whose start time is determined and another inspection task whose start time is not determined, the scheduling system 1 according to the present embodiment causes the robot 10 to efficiently execute the inspection tasks specified or designated by the administrator by automatically generating and registering an execution schedule for the robot 10 installed in the target site.

In the description of the embodiment, an inspection task is an example of a task to be executed by the robot 10, and the task to be executed by the robot 10 is not limited to the inspection work. In addition, the target site where the robot 10 is installed is not limited to a plant factory, and may be, for example, a business facility, a construction site, a substation, or another outdoor facility. For example, in a case where the inspection work at a site having a large site area is executed by manpower (workers), a lot of time may be taken to complete all the inspection work, or a plurality of workers may share the inspection work to complete all the inspection work. In alternative such the manpower (workers), the robot 10 installed at the target site executes the work (tasks), which is (are) conventionally executed by the manpower (workers), resulting in improvement in the work efficiency. Note that the target site is not limited to an outdoor site and may be an indoor site such as an office, a school, a factory, a warehouse, a commercial facility, or another facility. The target site may be any site in which there are needs or wants to cause the robot 10 to perform work that has been conventionally performed by manpower.

Figure 3:
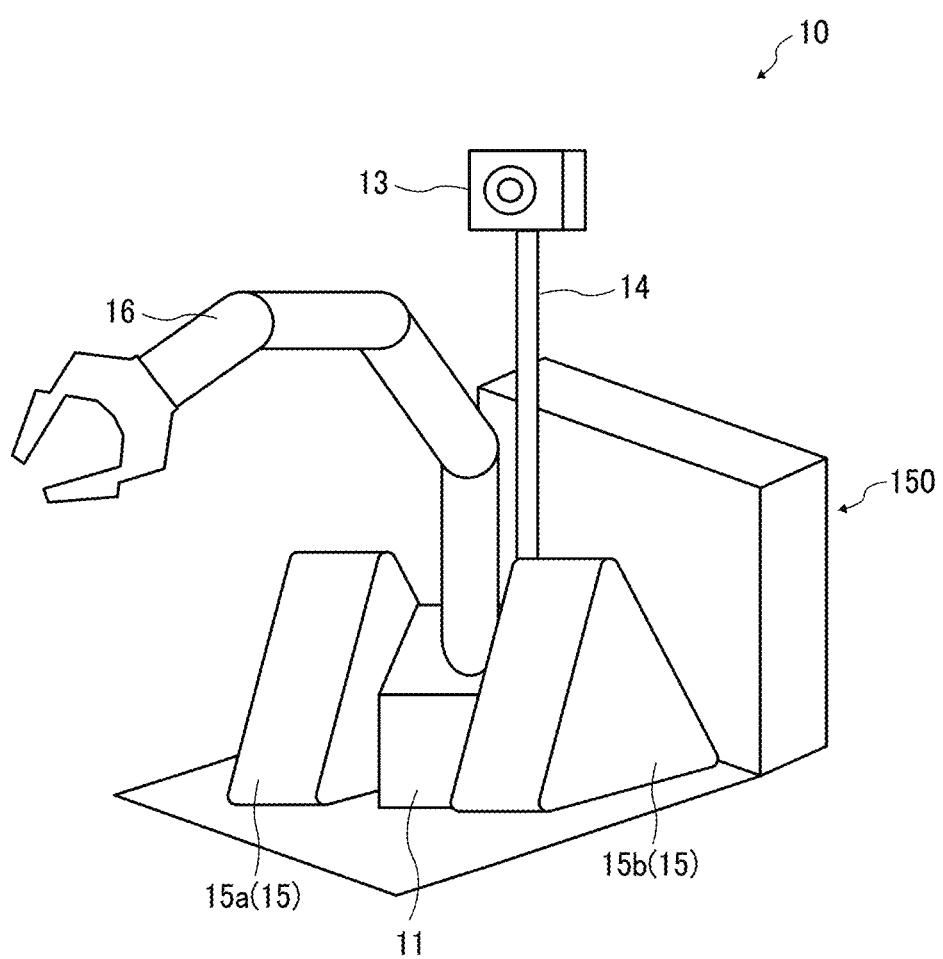

Configuration of Robot:

A description is given below of a specific configuration of the robot 10 with reference to FIG. 3. FIG. 3 is an illustration of an example of a schematic configuration of the robot 10 according to the present embodiment. In FIG. 3, the robot 10 is placed at the charging station as illustrated in FIG. 2 (the position P0 in FIG. 2).

The robot 10 illustrated in FIG. 3 includes a housing 11 including a control device 30 that controls processing or operation of the robot 10, an imaging device 13, a support member 14, a travel control device 15 (15a, 15b) for causing the robot 10 to move (travel), and a movable arm 16 for causing the robot 10 to perform predetermined work (operation). The control device 30, which controls processing or operation of the robot 10, is built in the housing 11 and corresponds to the position of a torso of the robot 10.

The imaging device 13 captures an image of a subject such as a person, an object, or a sight in the site where the robot 10 is installed, and obtains a captured image. The imaging device 13 is a digital camera (general imaging device) that acquires a planar image (detailed image), such as a digital single-lens reflex camera or a compact digital camera, for example. Captured image data related to the captured image obtained by the imaging device 13 is transmitted to the communication terminal 70 via a communication session established by a server computer such as a communication management server.

The captured image obtained by the imaging device 13 may be a video image or a still image, or may include both of the video image and the still image. The captured image obtained by the imaging device 13 may include audio data together with image data. In one or more embodiments, the imaging device 13 is a wide-angle image capturing device that acquires a spherical (360 degree) panoramic image. The wide-angle image capturing device is, for example, a spherical image capturing device for acquiring two hemispherical images from which a spherical (panoramic) image is to be generated by capturing an image of subject. In one or more embodiments, the wide-angle image capturing device is, for example, a wide-angle camera or a stereo camera that acquires a wide-angle image having an angle of view equal to or larger than a predetermined value. That is, the wide-angle image capturing device is an imaging device (imaging unit) to acquire an image (a spherical image or a wide-angle image) captured using a lens having a focal length shorter than a predetermined value. The robot 10 may include a plurality of imaging devices 13. In this case, the robot 10 may include, as the plurality of imaging devices 13, both a wide-angle image capturing device and a general imaging device that captures a part of an image of a subject captured by the wide-angle image capturing device and acquiring a detailed image (planar image).

The support member 14 is a member for installing (fixing) the imaging device 13 to the robot 10 (housing 11). The support member 14 may be a pole fixed to the housing 11, or may be a pedestal fixed to the housing 11. The support member 14 may be a movable member with which an imaging direction (orientation) or a position (height) of the imaging device 13 is adjustable.

The travel control device 15 is a unit that cause the robot 10 to move, or travel, and includes a wheel, a traveling motor, a traveling encoder, a steering motor, and a steering encoder, for example. Since travel control of the robot 10 is a known technique, a detailed description of the travel control is omitted. The robot 10 receives, for example, a travel instruction from the administrator who is an operator (the communication terminal 70), and the travel control device 15 causes the robot 10 to move, or travel, based on the received travel instruction. The travel control device 15 may be of a bipedal type or a single wheel type. In addition, the shape of the robot 10 is not limited to a vehicle type as illustrated in FIG. 3, and may be a humanoid-shaped robot, which is a bipedal robot. Alternatively, the shape of the robot 10 may be any other shape, for example, a shape like a certain living thing or a shape like a certain character or mascot.

The movable arm 16 has a moving device (moving unit) for enabling additional motion (operation) other than the travelling of the robot 10. As illustrated in FIG. 3, the movable arm 16 is provided with, for example, a hand as the moving device (moving unit) for gripping an object such as a component at the distal end of the movable arm 16. The robot 10 performs a predetermined work (motion, operation) by rotating or deforming the movable arm 16.

In one or more embodiments, in addition to the above-described configuration, the robot 10 includes various sensors to detect information around the robot 10. The various sensors include, for example, sensor devices such as a barometer, a thermometer, a photometer, a human detecting sensor, a gas sensor, an odor sensor, and an illuminometer.

The charging station 150 set in the target site is a place to charge a battery of the robot 10 or measure an operation state of the robot 10. The robot 10 stores, in advance, information on a position of the charging station 150 set in the target site and periodically moves, or travels, to the charging station 150 according to an operation of a worker (operator) in the target site, a remote operation performed by the administrator, or a self-determination in relation to the state of an amount of battery remaining, for example. A plurality of charging stations 150 may be set in the target site.

Hardware Configuration:

A description is given below of a hardware configuration of a device or a terminals included in the scheduling system 1 according to the present embodiment, with reference to FIG. 4 and FIG. 5. The hardware configuration of the device or the terminal illustrated in FIG. 4 and FIG. 5 may have elements to be added or to be deleted as necessary.

Figure 4:
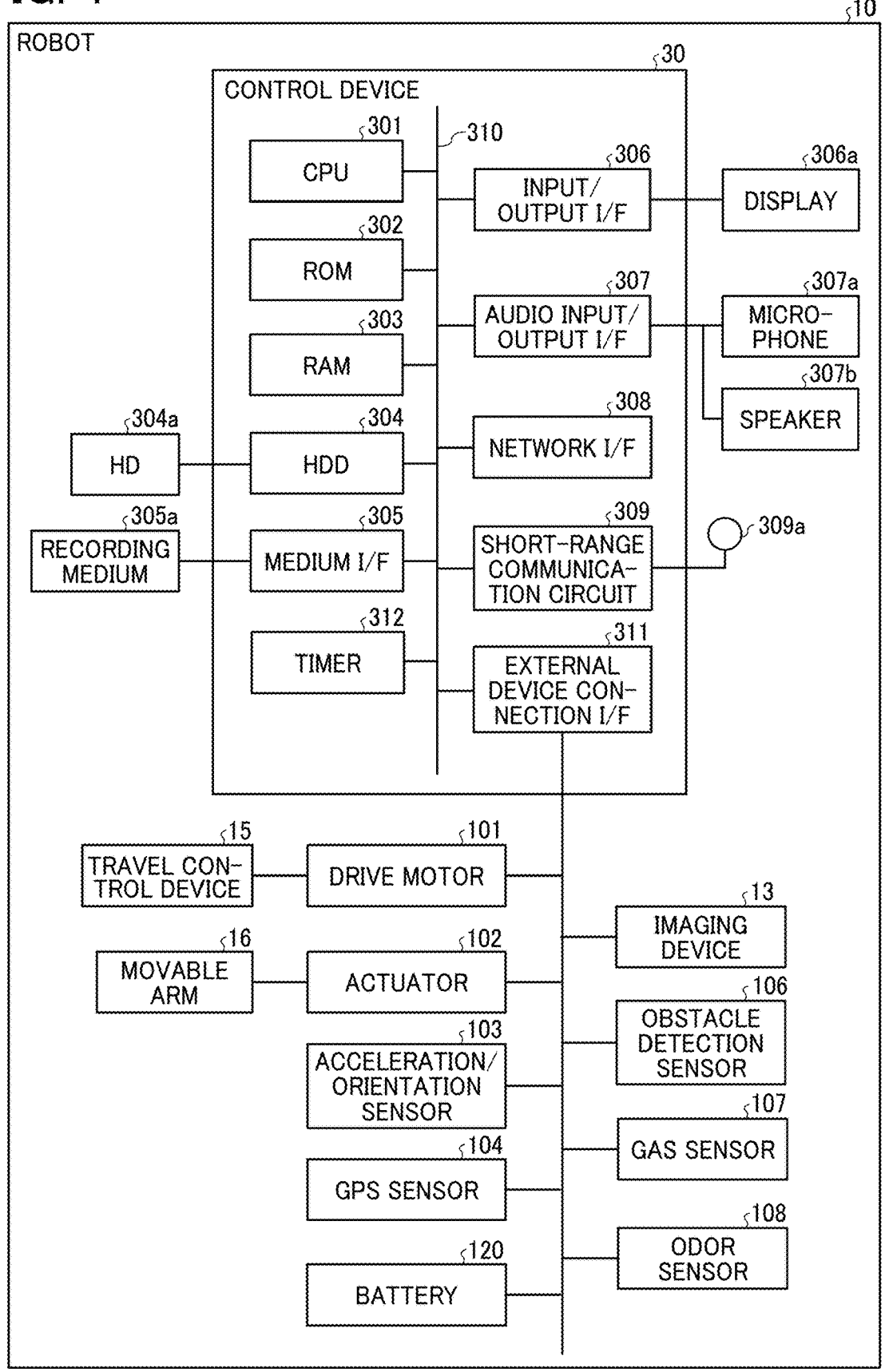

Hardware Configuration of Robot:

FIG. 4 is a block diagram illustrating an example of a hardware configuration of the robot 10 according to the present embodiment of the disclosure. The robot 10 includes the control device 30 that controls processing or operation of the robot 10. The control device 30 is provided inside the housing 11 of the robot 10, as described above. The control device 30 may be provided outside the housing 11 of the robot 10 or may be provided as a device separate from the robot 10.

The control device 30 includes a Central Processing Unit (CPU) 301, a Read Only Memory (ROM) 302, a Random Access Memory (RAM) 303, a Hard Disk Drive (HDD) 304, a medium interface (I/F) 305, an input/output I/F 306, an audio input/output I/F 307, a network I/F 308, a short-range communication circuit 309, an antenna 309*a* of the short-range communication circuit 309, an external device connection I/F 311, a timer 312, and a bus line 310.

The CPU 301 performs overall control of the robot 10. The CPU 301 is an arithmetic device that reads programs and data stored in, for example, the ROM 302 and a Hard Disk (HD) 304*a* to the RAM 303 and executes processing to implement functions of the robot 10.

The ROM 302 is a nonvolatile memory that holds programs and data even when the power is turned off. The RAM 303 is a volatile memory to be used as a work area for the CPU 301. The HDD 304 controls reading or writing of various data to or from the HD 304*a* under control of the CPU 301. The HD 304*a* stores various data such as a program. The medium I/F 305 controls reading or writing (storing) of data from or to a recording medium 305*a* such as a Universal Serial Bus (USB) memory, a memory card, an optical disk, or a flash memory.

The input/output I/F 306 is an interface for inputting or outputting characters, numerical values, or various instructions to or from various external devices, for example. The input/output I/F 306 controls display of various information such as a cursor, a menu, a window, a character, or an image on a display 306*a* such as a Liquid Crystal Display (LCD). In one or more embodiments, a touch panel display provided with an input device is used as the display 306*a*. The input/output I/F 306 may be connected to an input device such as a mouse or a keyboard in addition to the display 306*a*. The audio input/output I/F 307 is a circuit for inputting or outputting an audio signal to a microphone 307*a* or from a speaker 307*b* under control of the CPU 301. The microphone 307*a* is an example of audio collecting device, which is a built-in type, for inputting audio signals under control of the CPU 301. The speaker 307*b* is an example of reproducing device for outputting audio signals under control of the CPU 301.

The network I/F 308 is a communication interface for communicating (connecting) with another device or apparatus via the communication network 100. The network I/F 308 is, for example, a communication interface such as a wired or wireless LAN. The short-range communication circuit 309 is a communication circuit that communicates in compliance with NEAR FIELD COMMUNICATION (NFC) (Registered Trademark), BLUETOOTH (Registered Trademark), or the like. The external device connection I/F 311 is an interface for connecting the control device 30 to another device. The timer 312 is a measurement device that has a time measurement function. The timer 312 may be a computer-based software timer.

The bus line 310 includes an address bus and a data bus. The bus line 310 electrically connects the above-described elements to each another and transfers address signals, data signals, or various control signals. The CPU 301, the ROM 302, the RAM 303, the HDD 304, the medium I/F 305, the input/output I/F 306, the audio input/output I/F 307, the network I/F 308, the short-range communication circuit 309, the external device connection I/F 311, and the timer 312 are connected to each other through the bus line 310.

The control device 30 is further connected, via the external device connection I/F 311, to a drive motor 101, an actuator 102, an acceleration/orientation sensor 103, a Global Positioning System (GPS) sensor 104, the imaging device 13, a battery 120, an obstacle detection sensor 106, a gas sensor 107, and an odor sensor 108.

The drive motor 101 rotationally drives the travel control device 15 to cause the robot 10 to move, or travel, along the ground according to an instruction from the CPU 301. The actuator 102 deforms a movable arm 16 based on an instruction from the CPU 301. The acceleration/orientation sensor 103 includes various sensors such as an electromagnetic compass that senses geomagnetism, a gyrocompass, and an acceleration sensor. The GPS sensor 104 receives GPS signals from GPS satellites. The battery 120 is a unit that supplies power for the operation of the robot 10. The battery 120 may include an external battery that plays a role of auxiliary power supply from the outside, in addition to a battery built in the body of the robot 10. The obstacle detection sensor 106 is a detection sensor that detects obstacles around the robot 10 in moving. The obstacle detection sensor 106 is, for example, an image sensor such as a stereo camera or a camera mounted with an area sensor on which photoelectric conversion elements are arranged in a planar manner, or a distance measurement sensor such as a Time of Flight (TOF) sensor, a Light Detection And Ranging (LIDAR) sensor, or a radar sensor.

The gas sensor 107 and the odor sensor 108 are sensors that detects a gas generated at a target site where the robot 10 is installed. The gas sensor 107 detects the concentration of a specific gas in the air around the robot 10. The odor sensor 108 further detects odor in the air around the robot 10.

Figure 5:
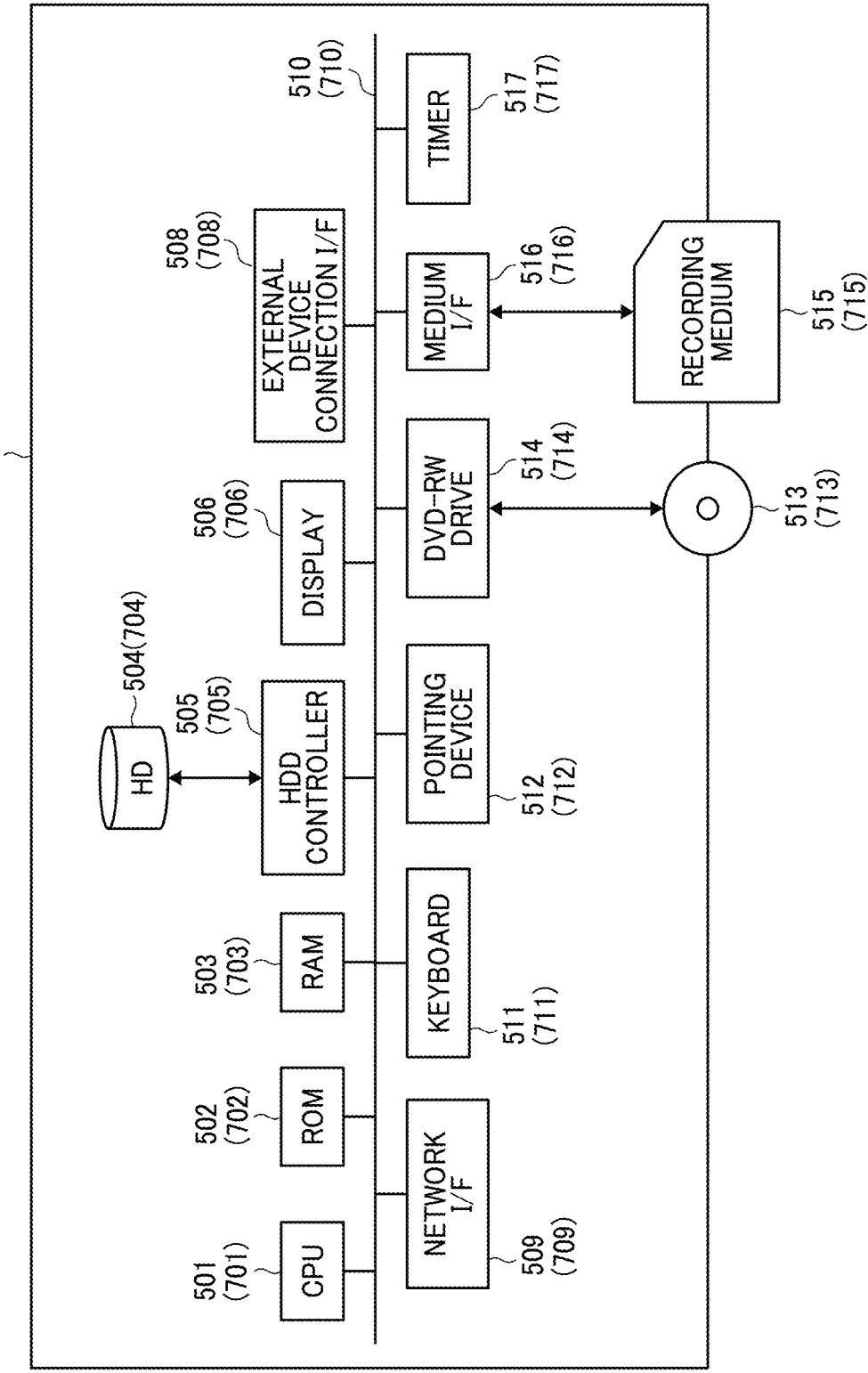

Hardware Configuration of Schedule Management Server:

FIG. 5 is a block diagram illustrating an example of a hardware configuration of the schedule management server 50 according to the present embodiment of the disclosure. Each of the elements of hardware configuration of the schedule management server 50 is denoted by a reference numeral in 500 series. The schedule management server 50 is implemented by a computer, and as illustrated in FIG. 5, includes CPU 501, ROM 502, RAM 503, HD 504, an HDD controller 505, a display 506, an external device connection I/F 508, a network I/F 509, a bus line 510, a keyboard 511, pointing devices 512, a Digital Versatile Disk Rewritable (DVD-RW) drive 514, a medium I/F 516, and a timer 517.

The CPU 501 performs overall control of the schedule management server 50. The ROM 502 stores programs such as an initial program loader (IPL) used for driving the CPU 501. The RAM 503 is used as a work area for the CPU 501. The HD 504 stores various data such as a program. The HDD controller 505 controls reading or writing of various data to or from the HD 504 under control of the CPU 501. The display 506 displays various types of information such as a cursor, a menu, a window, characters, or an image. In one example, the display 506 is a touch panel display provided with an input device (input unit). The external device connection I/F 508 is an interface for connecting various external devices. Examples of the external devices include, but are not limited to, a USB memory and a printer. The network I/F 509 is an interface that controls data communication performed with an external device through the communication network 100. The bus line 510 is, for example, an address bus or a data bus, which electrically connects the elements such as the CPU 501 illustrated in FIG. 5.

The keyboard 511 is one example of an input device (input unit) provided with a plurality of keys for enabling a user to input characters, numerals, or various instructions. The pointing device 512 is an example of the input device (input unit) that allows a user to select or execute various instructions, select a target for processing, or move a cursor being displayed. The input device is not limited to the keyboard 511 and the pointing device 512, and may be a touch panel, a voice input device, or the like. The DVD-RW drive 514 controls reading or writing of various data to or from a DVD-RW 513, which is an example of a removable recording medium. The removable recording medium is not limited to the DVD-RW and may be a Digital Versatile Disk-Recordable (DVD-R), or a BLU-RAY (registered trademark) disc (BLU-RAY disk), for example. The medium I/F 516 controls reading or writing (storing) of data from or to a recording medium 515 such as a flash memory. The timer 517 is a measurement device that has a time measurement function. The timer 517 may be a computer-based software timer.

Hardware Configuration of Communication Terminal:

FIG. 5 is a block diagram illustrating an example of a hardware configuration of the communication terminal 70 according to the present embodiment of the disclosure. Each hardware element of the communication terminal 70 is denoted by a reference numeral in 700 series. The communication terminal 70 is implemented by a computer and has the same configuration as that of the schedule management server 50 as illustrated in FIG. 5, and thus the description of each of the elements of the hardware configuration is omitted. The display 706 is an example of a display unit. The display unit as the display 706 may be an external device having a display function connected to the communication terminal 70. The display unit in this case may be, for example, an external display such as an interactive white board (IWB) or a projection target unit (for example, a ceiling or a wall of a management site) on which an image from a projector (PJ) connected as an external device is projected.

Further, any one of the above-described control programs may be recorded in a file in a format installable or executable on a computer-readable recording medium for distribution. Examples of the recording medium include, but not limited to, a Compact Disc Recordable (CD-R), a Digital Versatile Disc (DVD), a BLU-RAY (registered trademark) disc, a Secure Digital (SD) card, and a USB memory. In addition, such recording media may be provided in the domestic markets or foreign markets as program products. For example, the scheduling system 1 implements a schedule registration method according to the present embodiment by executing a program according to the present embodiment.

Figure 6:
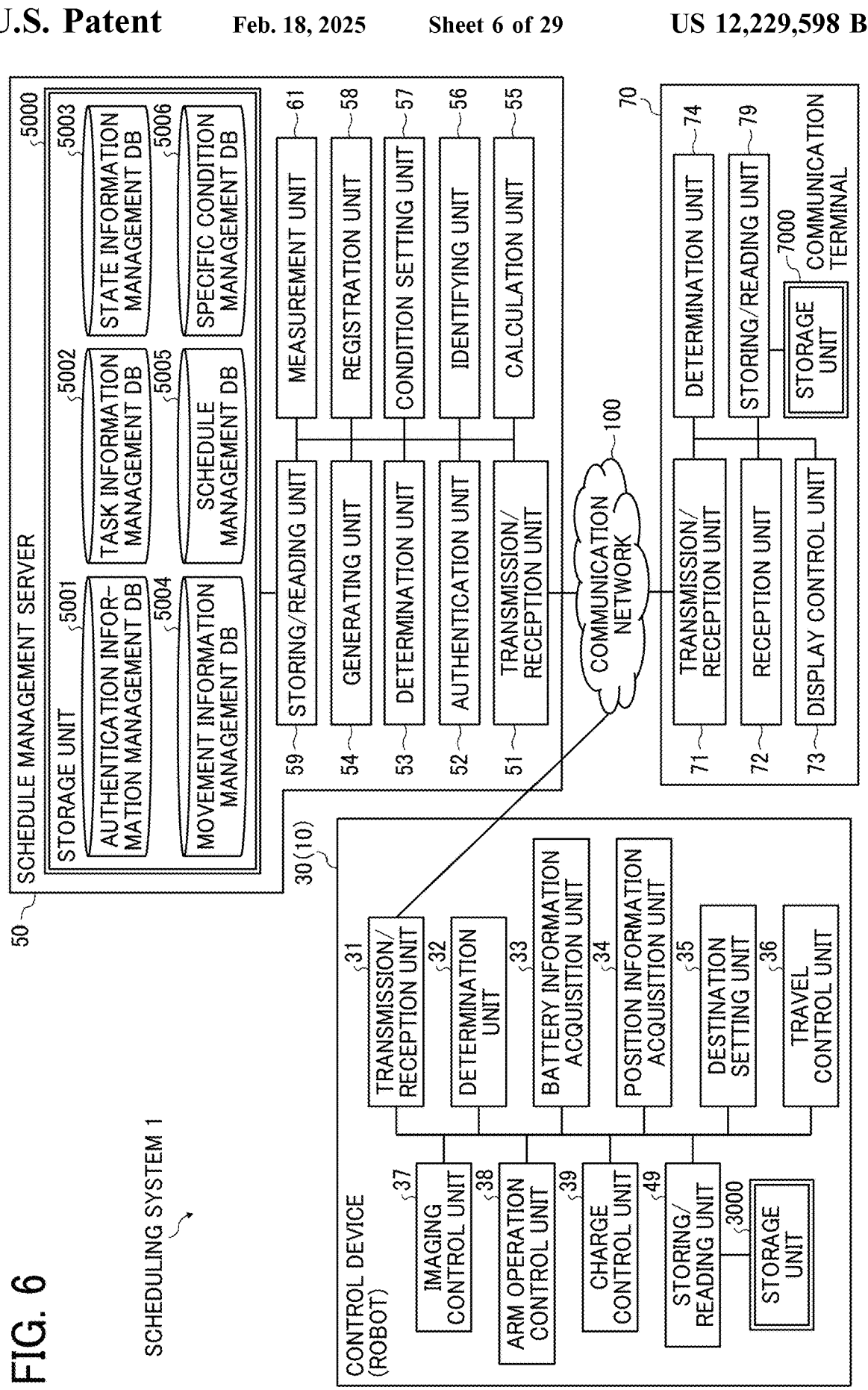

Functional Configuration:

A description is given below of a functional configuration of the scheduling system 1 according to the present embodiment, with reference to FIG. 6 to FIG. 11. FIG. 6 is a block diagram illustrating an example of the functional configuration of the scheduling system 1 according to the present embodiment of the disclosure. Note that devices or terminals illustrated in FIG. 6 are ones among from the devices or the terminals illustrate FIG. 1 and related to processing or operation described latter.

Functional configuration of Robot (Control Device):

First, a functional configuration of the control device 30, which controls processing or operation of the robot 10, is described with reference to FIG. 6. The control device 30 includes a transmission/reception unit 31, a determination unit 32, a battery information acquisition unit 33, a position information acquisition unit 34, a destination setting unit 35, a travel control unit 36, an imaging control unit 37, an arm operation control unit 38, a charge control unit 39, and a storing/reading unit 49. These units are functions that are implemented by or that are caused to function by operating any of the hardware elements illustrated in FIG. 4 in cooperation with the instructions of the CPU 301 according to the control program, which is for a control device, expanded to the RAM 303. The control device 30 further includes a storage unit 3000 implemented by the ROM 302, the HD 304*a*, or the recording medium 305*a* illustrated in FIG. 4.

The transmission/reception unit 31 is mainly implemented by processing of the CPU 301 illustrated in FIG. 4 in relation to the network I/F 308 illustrated in FIG. 4 and transmits or receives various data or information to or from another device or terminal through the communication network 100.

The determination unit 32 is implemented by processing of the CPU 301 and performs various determinations. The battery information acquisition unit 33 is mainly implemented by processing of the CPU 301 illustrated in FIG. 4 in relation to the external device connection I/F 311 illustrated in FIG. 4 and acquires battery information indicating an amount of charge remaining of the battery 120, which is a power source of the robot 10. The position information acquisition unit 34 is mainly implemented by processing of the CPU 301 illustrated in FIG. 4 in relation to the external device connection I/F 311 illustrated in FIG. 4 and acquires position information indicating a current position of the robot 10 detected by the GPS sensor 104.

The destination setting unit 35 is mainly implemented by processing of the CPU 301 illustrated in FIG. 4 and sets a travel destination of the robot 10. The destination setting unit 35 sets, based on a task execution request transmitted from the schedule management server 50, a position corresponding to the details of the specified task as the travel destination of the robot 10. The travel control unit 36 is mainly implemented by processing of the CPU 301 illustrated in FIG. 4 in relation to the external device connection I/F 311 illustrated in FIG. 4 and controls the travel, or movement, of the robot 10 by driving the travel control device 15. The travel control unit 36 causes the robot 10 to move, or travel, to the travel destination set by the destination setting unit 35 by driving the travel control device 15 according to information that indicates a start time to execute the task and is included in the task execution request transmitted from the schedule management server 50, for example.

The imaging control unit 37 is mainly implemented by processing of the CPU 301 illustrated in FIG. 4 in relation to the external device connection I/F 311 illustrated in FIG. 4 and controls imaging processing performed by the imaging device 13. For example, the imaging control unit 37 instructs the imaging device 13 to perform the imaging processing. In addition, the imaging control unit 37 acquires, for example, a captured image obtained by the imaging processing performed by the imaging device 13. The arm operation control unit 38 is mainly implemented by processing of the CPU 301 illustrated in FIG. 4 in relation to the external device connection I/F 311 illustrated in FIG. 4 and controls the operation of the movable arm 16. The arm operation control unit 38 changes the orientation or position of the movable arm 16 by, for example, deforming the movable arm 16. The charge control unit 39 is mainly implemented by processing of CPU 301 illustrated in FIG. 4 in relation to the external device connection I/F 311 illustrated in FIG. 4 and controls charging of the battery 120, which is a power source of the robot 10. For example, the charge control unit 39 charges the battery 120 by connecting the robot 10 to the charging station 150 as illustrated in FIG. 3.

The storing/reading unit 49 is implemented by processing of the CPU 301 illustrated in FIG. 4 and stores various data or information in the storage unit 3000 or reads out various data or information from the storage unit 3000.

Functional Configuration of Schedule Management Server:

Next, a functional configuration of the schedule management server 50 is described with reference to FIG. 6. The schedule management server 50 includes a transmission/reception unit 51, an authentication unit 52, a determination unit 53, a generating unit 54, a calculation unit 55, an identifying unit 56, a condition setting unit 57, a registration unit 58, a measurement unit 61, and a storing/reading unit 59. These units are functions that are implemented by or that are caused to function by operating any of the elements illustrated in FIG. 5 in cooperation with the instructions of the CPU 501 according to the control program, which is for a schedule management server, expanded to the RAM 503. The schedule management server 50 further includes a storage unit 5000 implemented by the ROM 502, the HD 504, or the recording medium 515 illustrated in FIG. 5.

The transmission/reception unit 51 is mainly implemented by processing of the CPU 501 in relation to the network I/F 509 and transmits or receives various data or information to or from another device or terminal.

The authentication unit 52 is implemented by processing of the CPU 501 and performs authentication of a user including the administrator of the target site registered in the schedule management server 50. The determination unit 53 is implemented by processing of the CPU 501 and performs various determinations.

The generating unit 54 is implemented by processing of the CPU 501 and generates a plurality of arrangement patterns to each of which specified inspection tasks are arranged. The generating unit 54 generates the plurality of arrangement patterns to each of which all of the specified inspection tasks are arranged based on, for example, a start time or an execution time of each of the specified inspection tasks. The execution time is a time taken to complete each inspection task.

The calculation unit 55 is implemented by processing of the CPU 501 and calculates a total amount of movement (travel) of the robot 10 and a final amount of battery remaining in each arrangement pattern generated by the generating unit 54. In the description of the embodiment, the total amount of movement is a movement amount, or a travel amount, of the robot 10 when all of the inspection tasks included in the arrangement pattern are completely executed. Further, the final amount of battery remaining is a value estimated as a battery remaining amount when all of the inspection tasks included in the arrangement pattern are completely executed.

The identifying unit 56 is implemented by processing of the CPU 501 and identifies one of the arrangement patterns generated by the generating unit 54. The identifying unit 56 identifies the one of the arrangement patterns among the plurality of generated arrangement patterns by using various specific conditions related to execution of the inspection tasks. Examples of the specific condition used in the identifying processing performed by the identifying unit 56 includes conditions in relation to a final amount of battery remaining of the robot 10, an estimated amount of battery remaining that is estimated battery remaining amount of the robot 10 in executing the inspection task, the number of replacement times of the robot 10 that executes the inspection task, a total amount of movement of the robot 10, an end time at which all the inspection tasks are completed.

The condition setting unit 57 is implemented by processing of the CPU 501 and sets a specific condition used for identifying an arrangement pattern in the identifying processing performed by the identifying unit 56. The registration unit 58 is implemented by processing of the CPU 501 and performs schedule registration of the specified inspection tasks. The registration unit 58 registers, in the schedule management database (DB) 5005, the schedule indicating the arrangement pattern identified by the identifying unit 56. The measurement unit 61 is implemented by processing of the CPU 501 in relation to the timer 517 and measures time such as time for executing each inspection task.

The storing/reading unit 59 is implemented by processing of the CPU 501 and stores various data or information in the storage unit 5000 or reads out various data or information from the storage unit 5000.

Authentication Information Management Table:

FIG. 7 is a conceptual diagram illustrating an example of an authentication information management table, according to the present embodiment of the disclosure. The storage unit 5000 stores an authentication information management DB 5001, which is implemented by the authentication information management table as illustrated in FIG. 7.

In the authentication information management table, a user identification (ID) for identifying each of all users (administrators) managed by the schedule management server 50 is associated with a corresponding password. For example, in the authentication information management table illustrated in FIG. 7, the user ID and the password of an administrator A is "w001" and "aaaa", respectively. In the authentication information management table, a terminal ID for identifying the communication terminal 70 may be associated with the password, in alternative to the user ID of the administrator. In this case, the authentication unit 52 does not performs user authentication for the administrator, but terminal authentication for the communication terminal 70 used by the administrator.

Task Information Management Table:

FIG. 8 is a conceptual diagram illustrating an example of a task information management table, according to the present embodiment of the disclosure. The task information management table is a table for managing an inspection task for an inspection target object present at the target site. The storage unit 5000 stores a task information management DB 5002, which is implemented by the task information management table as illustrated in FIG. 8.

With the task information management table, task information indicating one or more inspection tasks each corresponding to an inspection object is managed for each user ID identifying an administrator. Each record, which is corresponding to an inspection task, of the task information includes data items of task ID, task name, time information, position information, estimated amount of battery consumption, and processing information. Each of the task ID and the task name identifies a corresponding inspection task. The time information includes start time information that indicates a start time of an inspection task and execution time information that indicates a period of time taken to complete a corresponding inspection task. The position information indicates a position at which a corresponding inspection task is executed in the target site. The estimated amount of battery consumption indicates an estimated consumption amount of the battery 120 in executing a corresponding inspection task. The processing information indicates processing to be executed by the robot 10.

The start time information is given to an inspection task having a start time, namely an inspection task to which a start time is set. An inspection task having no start time, namely, an inspection task to which no start time is set, has a blank as the data item of start time in the corresponding record. The inspection task having a start time is, for example, a task such as checking for liquid leaks from a tanker in transporting, or shipping. On the other hand, the inspection task having no start time is a task such as, for example, daily inspection of which inspection execution frequency is set to two times per day, for example. The position information includes coordinate information of latitude and longitude indicating a position at which the robot 10 executes the inspection task. The execution time information and the estimated amount of battery consumption indicated in the task information may be set for an environment in the site, such as weather or the presence or absence of construction, or for time zone such as morning or afternoon.

State Information Management Table:

FIG. 9 is a conceptual diagram illustrating an example of a state information management table, according to the present embodiment of the disclosure. The state information management table is a table for managing state information indicating a state of the robot 10. The storage unit 5000 stores a state information management DB 5003, which is implemented by the state information management table as illustrated in FIG. 9.

With the state information management table, state information in which a record including data items of robot ID, robot name, position information, and battery information are associated with each other is managed. Each of the robot ID and the robot name identifies the robot 10. The position information indicates a current position at which the robot 10 is. The battery information indicates an amount of battery remaining of the robot 10 at a current time. The position information includes coordinate information of latitude and longitude indicating a current position of the robot 10 measured by the GPS sensor 104. In addition, the position information and the battery information are transmitted from each robot 10 installed at the target site to the schedule management server 50 as needed or periodically. The position information is not limited to the latitude and the longitude, and may be represented by XY coordinates indicating a coordinate position on map data indicating the entire target site. The state information may include information indicating performance of the robot 10, such as various sensors provided in the robot 10, a traveling speed, or battery performance.

Movement Information Management Table:

FIG. 10 is a conceptual diagram illustrating an example of a movement information management table, according to the present embodiment of the disclosure. The movement information management table is a table for managing movement information that indicates estimated amount of resource consumption of the robot 10 in moving, or traveling, between two predetermined points (positions) in the target site. The storage unit 5000 stores a movement information management DB 5004, which is implemented by the movement information management table as illustrated in FIG. 10.

In the movement information management table, two reference points (reference positions), a reference point 1 and a reference point 2, in the target site are associated with each other. In addition, a record managed in the movement information management table includes data items of Reference Point 1, Reference Point 2, estimated amount of battery consumption, and travel time, in association with each other. The estimated amount of battery consumption indicates an amount of consumption estimated in a case that the robot 10 moves, or travels, from one of the reference point 1 and reference point 2 to the other one of the reference point 1 and reference point 2. The travel time indicates a time taken for the robot 10 to move, or travel, from one of the reference point 1 and reference point 2 to the other one of the reference point 1 and reference point 2. The reference point 1 and the reference point 2 are represented by coordinate information of latitude and longitude indicating a predetermined reference position in the target site. The estimated amount of battery consumption and the travel time may be updated time to time according to a deterioration degree of the battery 120 of the robot 10. In addition, the estimated amount of battery consumption may be automatically updated when the travel time is updated. In addition, the movement information management table may be set in a manner that the travel time for a route has plenty of time according to the frequency of automatic avoidance or braking occurs in the route in the past.

FIG. 26A to FIG. 26C (FIG. 26) are conceptual diagrams each illustrating a modification of the movement information management table according to the present embodiment. In the movement information management tables illustrated in FIG. 26A to FIG. 26C (FIG. 26), environmental conditions including the weather, an environment in the site, or a time zone are associated with the movement information illustrated in FIG. 10, and an estimated amount of battery consumption and a travel time are associated with each environmental condition. FIG. 26A is a movement information management table in which an estimated amount of battery consumption and a travel time are set for each weather being as an environmental condition. The environmental condition illustrated in FIG. 26 may include a value of wind speed in addition to "SUNNY", "CLOUDY", "RAINY", and "SNOWY". In addition, the estimated amount of battery consumption and the travel time illustrated in FIG. 26A may be set by multiplying a predetermined coefficient for each weather.

FIG. 26B is a movement information management table in which an estimated amount of battery consumption and a travel time are set for each environment as an environmental condition, such as presence or absence of construction in the site. The environment in the site is not limited to the presence or absence of construction, and may include information such as presence or absence of a closed road in the site or presence or absence of an entrance for a vehicle such as a tank lorry. FIG. 26C is a movement information management table in which an estimated amount of battery consumption and a travel time are set for each time zone being as an environmental condition, such as morning or afternoon. The estimated amount of battery consumption and the travel time illustrated in FIG. 26C are set according to a tendency in relation to each time zone in the site, such as a time during which a vehicle easily passes or a time during which a people frequently move. As illustrated in FIG. 26, with the movement information management table, the estimated amount of battery consumption and the travel time are managed according to each traveling environment for the robot 10 such as the weather, the environment in the site, or the time zone.

Schedule Management Table:

FIG. 11 is a conceptual diagram illustrating an example of a schedule management table, according to the present embodiment of the disclosure. The schedule management table is a table for managing a schedule in which the inspection tasks to be executed by the robot 10 is arranged. The storage unit 5000 stores a schedule management DB 5005, which is implemented by the schedule management table as illustrated in FIG. 11.

With the schedule management table, schedule information indicating a schedule in which the inspection tasks are arranged is managed for each user ID for identifying an administrator. The schedule information includes time information indicating a scheduled start time and a scheduled end time for executing each inspection task, a task ID for identifying a corresponding inspection task to be executed, and a robot ID for identifying the robot 10 that executes a corresponding inspection task.

Functional Configuration of Communication Terminal:

Next, a functional configuration of the communication terminal 70 is described with reference to FIG. 6. The communication terminal 70 includes a transmission/reception unit 71, a reception unit 72, a display control unit 73, a determination unit 74, and a storing/reading unit 79. These units are functions that are implemented by or that are caused to function by operating any of the elements illustrated in FIG. 5 in cooperation with the instructions of the CPU 701 according to the control program, which is for a communication terminal, expanded to the RAM 703. The communication terminal 70 further includes a storage unit 7000 implemented by the ROM 702, the HD 704, or the storage medium 715 illustrated in FIG. 5.

The transmission/reception unit 71 is mainly implemented by processing of the CPU 701 in relation to the network I/F 709 and transmits or receives various data or information to or from another device or terminal through the communication network 100.

The reception unit 72 is implemented by processing of the CPU 701 in relation to the keyboard 711 or the pointing device 712 and receives various selections or inputs from the user. The display control unit 73 is implemented mainly by processing of the CPU 701 and displays various screens on a display unit such as the display 706. The determination unit 74 is implemented by processing of the CPU 701 and performs various determinations.

The storing/reading unit 79 is implemented by processing of the CPU 701 and stores various data or information in the storage unit 7000 or reads out various data or information from the storage unit 7000.

Figure 12:
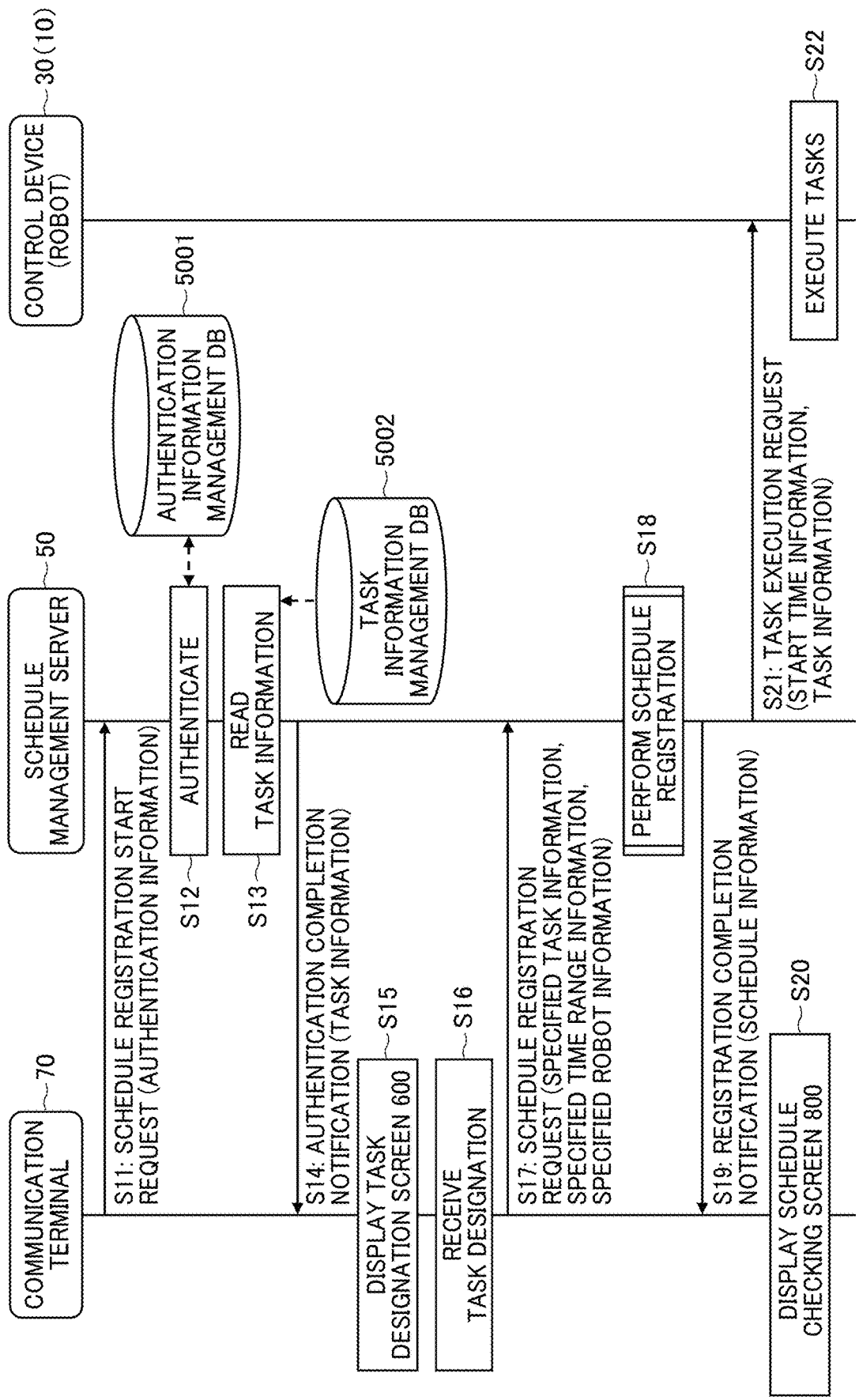

Processes or Operation: Schedule Registration Process:

A description is given below of processes or operation of the scheduling system 1 according to the present embodiment, with reference to FIG. 12 to FIG. 25. First, a process of registering a schedule for the robot 10 to execute one or more inspection tasks is described with reference to FIG. 12 to FIG. 19. In the description of the present embodiment, the one or more inspection tasks are a plurality of inspection tasks. FIG. 12 is a sequence diagram illustrating an example of schedule registration process, according to the present embodiment of the disclosure. In the example of process illustrated in FIG. 12, an administrator A at the management site requests for schedule registration with respect to the plurality of inspection tasks to be executed by the robot 10.

The transmission/reception unit 71 of the communication terminal 70 transmits, to the schedule management server 50, a schedule registration start request indicating a request to start registering a schedule corresponding to the plurality of inspection tasks, in response to a user operation of input operation performed using an input device (input unit) of the communication terminal 70 by the administrator A at the management site. (step S11). The schedule registration start request includes authentication information used to authenticate the administrator A by the schedule management server 50. Accordingly, the transmission/reception unit 51 of the schedule management server 50 receives the schedule registration start request transmitted from the communication terminal 70.

Subsequently, the authentication unit 52 of the schedule management server 50 searches the authentication information management DB 5001 (see FIG. 7) using the user ID and the password included in the authentication information received by the transmission/reception unit 51 as search keys. Then, the authentication unit 52 performs authentication by determining whether the same pair of the user ID and the password is stored in the authentication information management DB 5001 (step S12). In the following description of the present embodiment, a case in which the authentication unit 52 determines that the administrator A is a user who has a legitimate use authority is described. In one or more embodiments, terminal authentication is performed in alternative to user authentication. More specifically, authentication unit 52 may perform authentication with respect to the communication terminal 70 that transmits authentication information, in alternative to the authentication performed with respect to the administrator A.

When the authentication unit 52 determines that the administrator A is a user who has a legitimate use authority, the storing/reading unit 59 reads the task information stored in the task information management DB 5002 (see FIG. 8) (step S13). In this case, the storing/reading unit 59 searches the task information management DB 5002 using the user ID of the administrator A authenticated in step S12 as search key to read the task information associated with the same user ID as the user ID of the administrator A.

Subsequently, the transmission/reception unit 51 transmits, to the communication terminal 70, which is the request source, an authentication completion notification indicating that the authentication performed by the authentication unit 52 is completed (step S14). The authentication completion notification includes the task information read in step S13. Accordingly, the transmission/reception unit 71 of the communication terminal 70 receives the authentication completion notification transmitted from the schedule management server 50.

Figure 13:
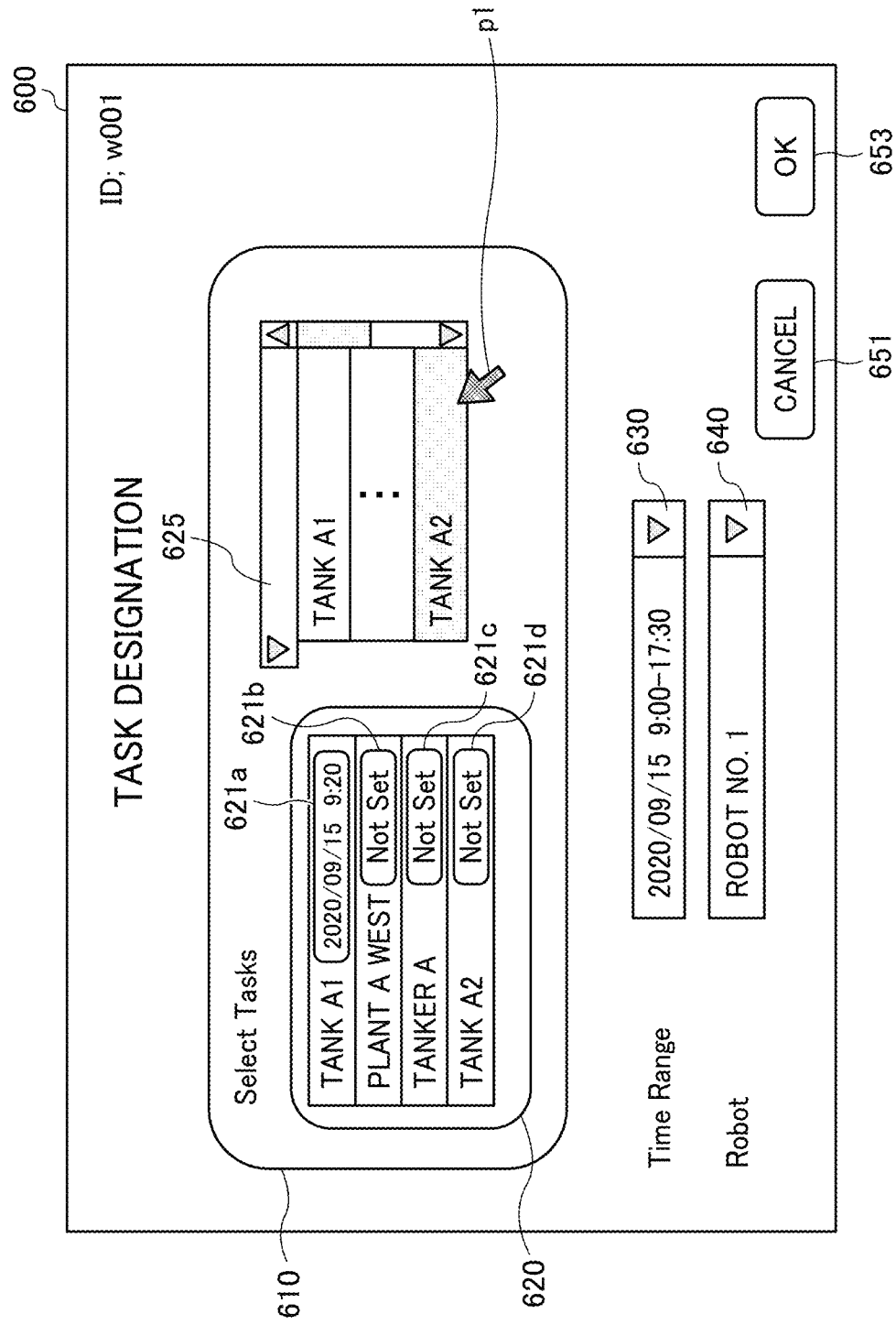

Then, the display control unit 73 of the communication terminal 70 causes the display 706 to display a task designation screen 600 for designating the plurality of inspection tasks to be scheduled and registered (step S15). FIG. 13 is a diagram illustrating an example of a task designation screen displayed on the communication terminal 70 according to the present embodiment of the disclosure. The task designation screen 600 illustrated in FIG. 13 is a display screen with which the administrator A designates the plurality of inspection tasks to be scheduled and registered. With the task designation screen 600, the administrator A specifies each inspection task to be scheduled and registered, specifies a time range for executing the plurality of inspection tasks, and specifies a robot that is to execute each inspection task.

The task designation screen 600 includes a task selection section 610 for selecting one or more inspection tasks to be designated as a target for the schedule registration, a specified time range input field ("Time Range") 630 for specifying, or setting, a period of time for executing the one or more inspection tasks selected, a specified robot input field ("Robot") 640 for specifying the robot 10 that is to execute the one or more inspection tasks selected, a "CANCEL" button 651 to be pressed to cancel the task designation processing, and an "OK" button 653 to be pressed to register the one or more inspection tasks selected, as designated tasks.

The task selection section 610 includes a task display area 620 in which the one or more inspection tasks selected are displayed, and a selection menu 625 for selecting an inspection task that may be registered by the administrator A. When the administrator A selects an inspection task, which is displayed in the selection menu 625, using a pointer p1, the selected inspection task is displayed in the task display area 620. The task display area 620 includes a start time input fields 621 (621a, 621b, 621c, 621d) for inputting a start time for executing the corresponding selected inspection task. By inputting a desired start time in each start time input field 621, the administrator A sets the start time for the corresponding inspection task. The input of the start time to each start time input field 621 is optional, and "Not Set" is displayed in each start time input field 621 of the corresponding inspection task for which the start time is not specified (in the example of FIG. 13, the start time input fields 621b, 621c, and 621d).

In one or more embodiments, each input item in the task designation screen 600 is automatically input or selected in cooperation with an external system, based on a daily schedule confirmed in a morning meeting for a corresponding day, for example. In one or more embodiments, the task designation screen 600 displays an alert for failing to perform setting, in response to receiving impractical selection according to a selection operation in relation to the task designation performed by the administrator A. An example of the impractical selection is specifying three robots 10 for a certain period of time even when there are two robots 10 operable at that time. Further, in one or more embodiments, the task designation screen 600 displays, for example, a message such as a proposal to execute inspection on a place, or an area, where an abnormality has occurred in the past, or a message to inform the user regarding the robots 10 that had a trouble or the like in the past. In addition, in the present embodiment, a start time for a specific inspection task is settable by inputting the start time on the task designation screen 600. In one or more embodiments, for example, a time in relation to executing one or more inspection tasks may be set for each area. More specifically, a start time or a period of time (time range) for executing the one or more inspection tasks to be executed within the same area in the site may be set.

Referring again to FIG. 12, when the administrator A performs various input operations on the task designation screen 600 and presses the "OK" button 653, the reception unit 72 of the communication terminal 70 receives the inspection task designation (step S16). Subsequently, the transmission/reception unit 71 transmits, to the schedule management server 50, a schedule registration request indicating a request for the schedule registration for the plurality of inspection tasks each of which is the specified task corresponding to the task designation received in step S16 (step S17). The schedule registration request includes specified task information for identifying each of the plurality of inspection tasks selected using the selection menu 625 of the task selection section 610, specified time range information input to the specified time range input field 630, and specified robot information input to the specified robot input field 640. The specified task information includes a task ID or a task name for identifying each of the plurality of specified inspection tasks and specified start time information indicating a specified (set) start time. Accordingly, the transmission/reception unit 51 of the schedule management server 50 receives the schedule registration request transmitted from the communication terminal 70. In step S16, the input of the specified time range to the specified time range input field 630 and the input of the specified robot to the specified robot input field 640 illustrated in FIG. 13 are optional. That is, the schedule registration request transmitted from the communication terminal 70 includes at least the specified task information for identifying each of the plurality of inspection tasks specified, or selected, by the administrator A.

Figure 14:
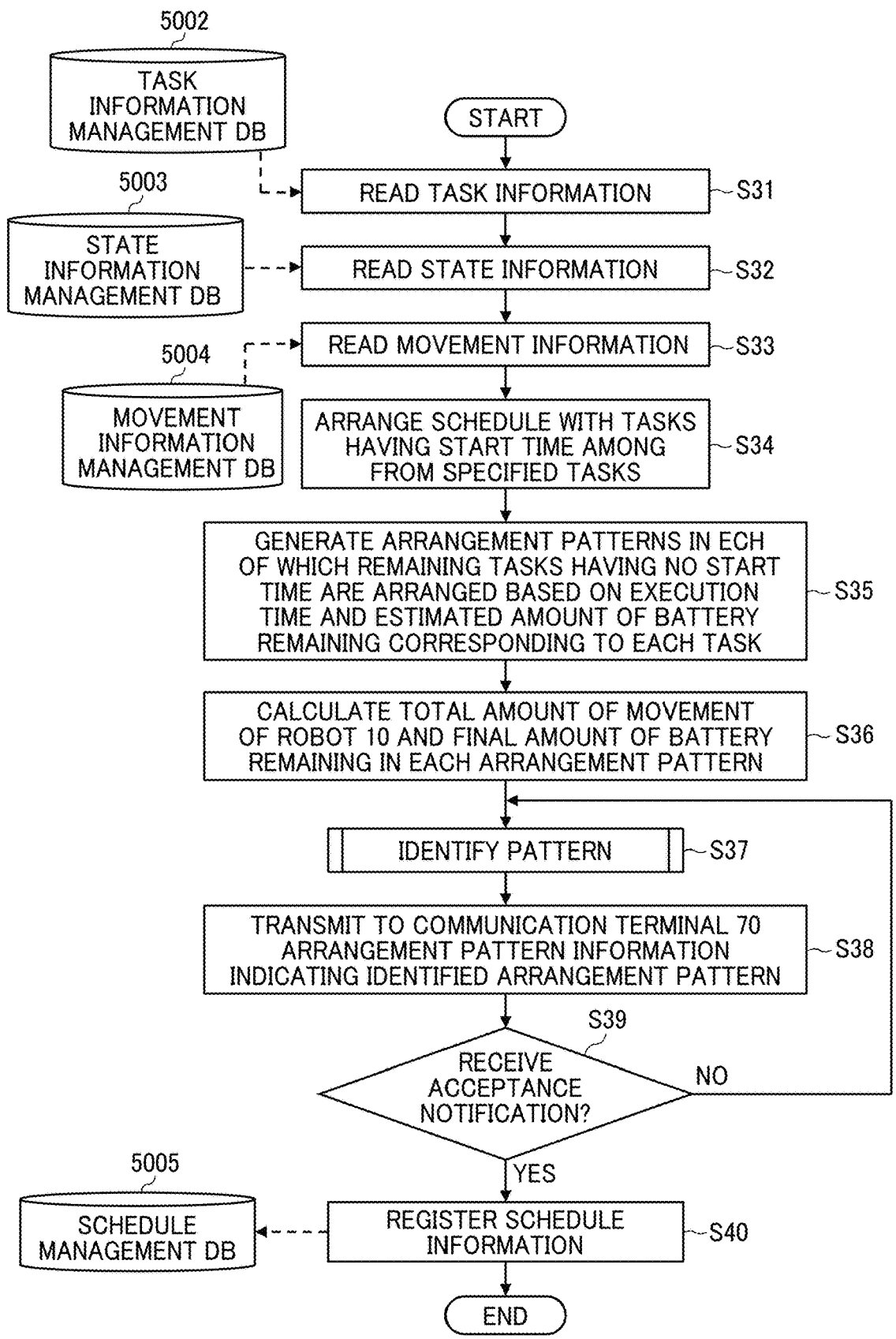

Then, the schedule management server 50 performs the processing of schedule registration for the plurality of inspection tasks specified by the administrator A, based on the schedule registration request received in step S17 (step S18). The processing of schedule registration performed by the schedule management server 50 is described in detail with reference to FIG. 14 to FIG. 17. FIG. 14 is a flowchart illustrating an example of the processing of schedule registration by the schedule management server 50 according to the present embodiment of the disclosure.

The storing/reading unit 59 searches the task information management DB 5002 (see FIG. 8) using the user ID of the administrator A authenticated in step S12 and the task ID or the task name included in the specified task information received in step S17 as search keys. Subsequently, the storing/reading unit 59 reads the task information associated with the same user ID as the user ID of the administrator A and the same task ID or the same task name as the one included in the received specified task information (step S31). When the execution time information and the estimated amount of battery consumption are set for each of specific environmental conditions in the task information management DB 5002, the storing/reading unit 59 may read the task information corresponding to an environmental condition of the current site. In addition, the environmental condition of the current site may be acquired by cooperation with an external system, or may be input on the task designation screen 600 illustrated in FIG. 13.

In addition, the storing/reading unit 59 searches the state information management DB 5003 (see FIG. 9) using the robot ID or robot name indicated in the specified robot information received in step S12 as a search key to read state information associated with the same robot ID or robot name as the one included in the received specified robot information (step S32). When the specified robot information is not included in the schedule registration request received in step S17, the storing/reading unit 59 reads all of the state information stored in the state information management DB 5003, that is, the state information corresponding to all of the robots 10 installed in the target site. In a case where information indicating performance of the robot 10 is included in the state information stored in the state information management DB 5003, the storing/reading unit 59 may read the state information of the robot 10 having performance suitable for executing the inspection task corresponding to the specified task information received in step S17.

The storing/reading unit 59 reads the movement information stored in the movement information management DB 5004 (see FIG. 12 or FIG. 26) (step S33). For example, in a case where the movement information is set by taking account each environmental condition as illustrated in FIG. 26, the storing/reading unit 59 may read the movement information corresponding to an environmental condition of the current site. In this case, the schedule management server 50 reflects the movement information according to the environmental condition of the current site in arranging the schedule, resulting in improving the scheduling accuracy.

Subsequently, the generating unit 54 arranges the schedule with one or more tasks each having a start time among from the plurality of specified tasks, based on the specified robot information received in step S17, the start time information included in the task information read out in step S31, and the specified start time information included in the specified task information received in step S17 (step S34). More specifically, the generating unit 54 preferentially arranges the schedule in a manner that the robot 10 indicated by the specified robot information starts an inspection task that is associated with the specified start time information, among the plurality of inspection tasks corresponding to the received specified task information, at a start time indicated by the specified start time information. In the example of FIG. 13, a task name of "TANK A1" is corresponding to the inspection task for which the start time is specified, and a robot name of "ROBOT NO. 1" is corresponding to the specified robot 10. In addition, the generating unit 54 arranges the schedule in a manner that an inspection task whose start time is not specified by the administrator A but whose start time information is included in the read task information, among the plurality of inspection tasks corresponding to the received specified task information, is to be started at a start time indicated by the start time information. In the example of the task information illustrated in FIG. 8, a task ID of "A3" (task name of "TANKER A," hereinafter referred to as "TASK A3") corresponds to the inspection task having the start time.

In the example of the present embodiment, the inspection task having a task ID of "A1" (task name of "TANK A1," hereinafter referred to as "TASK A1"), the start time (9:20) specified by the administrator A is different from the start time (9:00) indicated by the task information. In this case, the generating unit 54 preferentially assigns the start time specified by the administrator A as the start time of executing the inspection task.

Subsequently, the generating unit 54 generates one or more possible arrangement patterns with the other (remaining) inspection tasks that are indicated by the specified task information and have no start time, based on the specified robot information and the specified time range information received in step 17, the execution time information and the estimated amount of battery consumption included in the task information read in step S31, and the movement information read in step S33 (step S35).

More specifically, the generating unit 54 generates the one or more possible arrangement patterns in which all the remaining inspection tasks indicated in the specified task information are arranged within the specified time range indicated by the specified time range information for the schedule to which the one or more tasks each having the start time is previously arranged in step S33. The generating unit 54 arranges all of the plurality of inspection tasks in a manner that the remaining inspection tasks are further executable using the specified robot 10, based on the execution time and the estimated amount of battery consumption corresponding to each of the remaining inspection tasks in addition to the travel time and the estimated amount of battery consumption of the robot 10 in travelling. When there are a plurality of different arrangement patterns in each of which all the inspection tasks are arranged within the specified time range, the generating unit 54 generates the plurality of arrangement patterns.

In the example of FIG. 13, the generating unit 54 generates one or more possible arrangement patterns in each of which the remaining inspection tasks, a task ID of "A2" (task name of "PLANT A WEST", hereinafter referred to as "TASK A2"), a task ID of "A4" (task name or "TANK A2", hereinafter referred to as "TASK A4") are executed by the robot 10 that is the specified robot having the robot name of "ROBOT NO. 1" in the specified time range (2020/9/15 9:00 to 17:30), by taking account the execution time and the estimated battery consumption for each of the remaining inspection tasks and the travel time and the estimated amount of battery consumption of the robot 10 in travelling. In a case where the schedule registration request received in step S17 does not include the specified time range information, the generating unit 54 generates the arrangement patterns such that the remaining inspection tasks are arranged within a preset time range such as within a current day, within two days, or within one week, for example. In addition, in a case where the specified robot information is not included in the schedule registration request received in step S17, the generating unit 54 generates the arrangement patterns such that each of the remaining inspection tasks is assigned to any one or more of the robots 10 installed in the target site based on the state information of all the robots 10 read in step S32, for example.

Subsequently, the calculation unit 55 calculates a total amount of movement of the robot 10 and the final amount of battery remaining of the robot 10 in each arrangement pattern generated in step S35 (step S36). More specifically, the calculation unit 55 calculates the total amount of movement of the robot 10, in each arrangement pattern generated, assuming that the all the inspection tasks are completely executed, based on the position information included in the task information read in step S31 and the movement information read in step S33. The total amount of movement is a distance of movement (travelling) of the robot 10, calculated based on each position at which a corresponding inspection task is to be executed and the position of the charging station 150, for example. In addition, the calculation unit 55 calculates an estimated final amount of battery remaining as the remaining amount of the battery of the robot 10 after all the inspection tasks arranged in each generated arrangement pattern are executed, based on the estimated amount of battery consumption indicated in the task information read in step S31 and the estimated amount of battery consumption indicated in the movement information read in step 33.

Figure 15A:
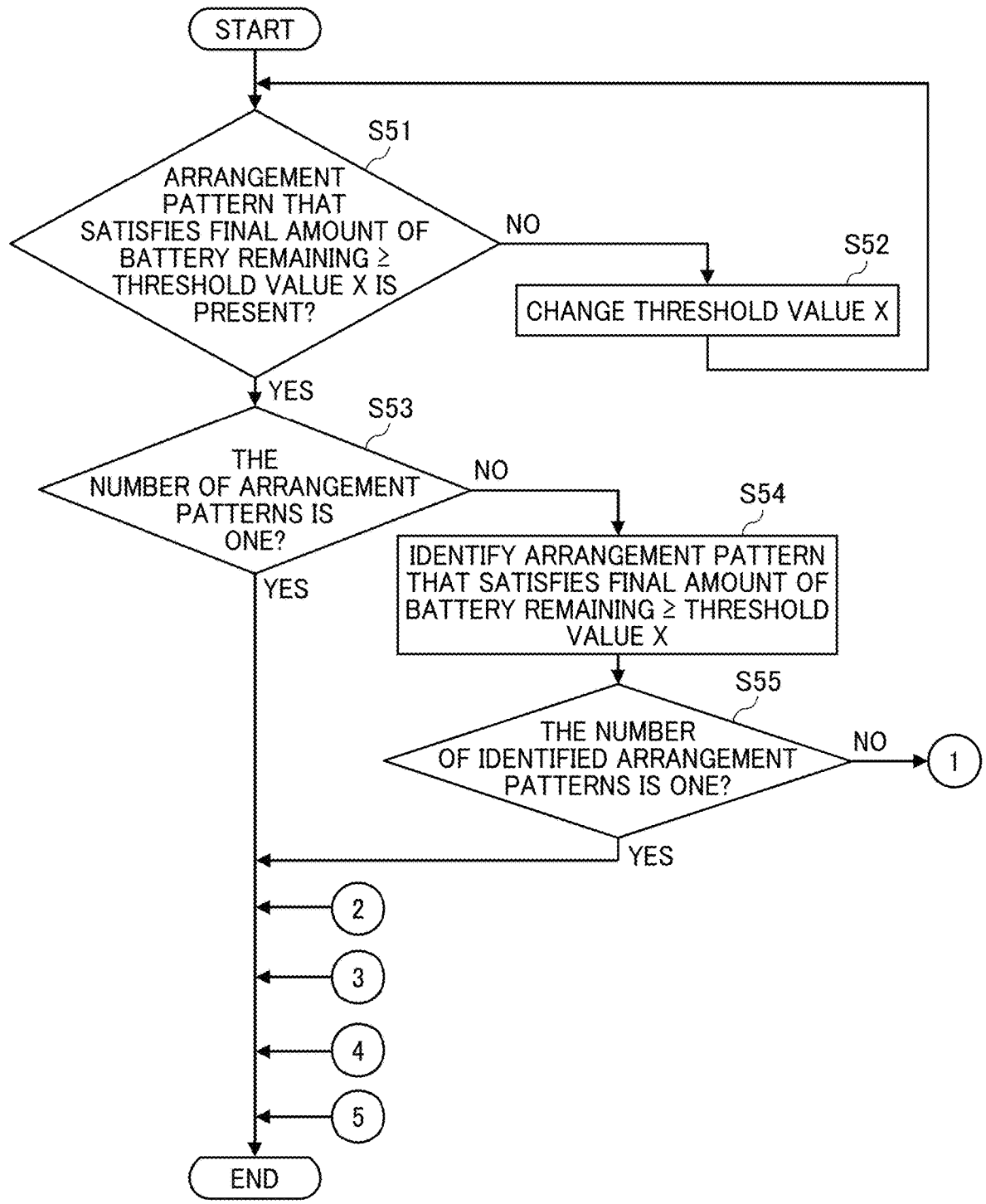
Figure 15B:
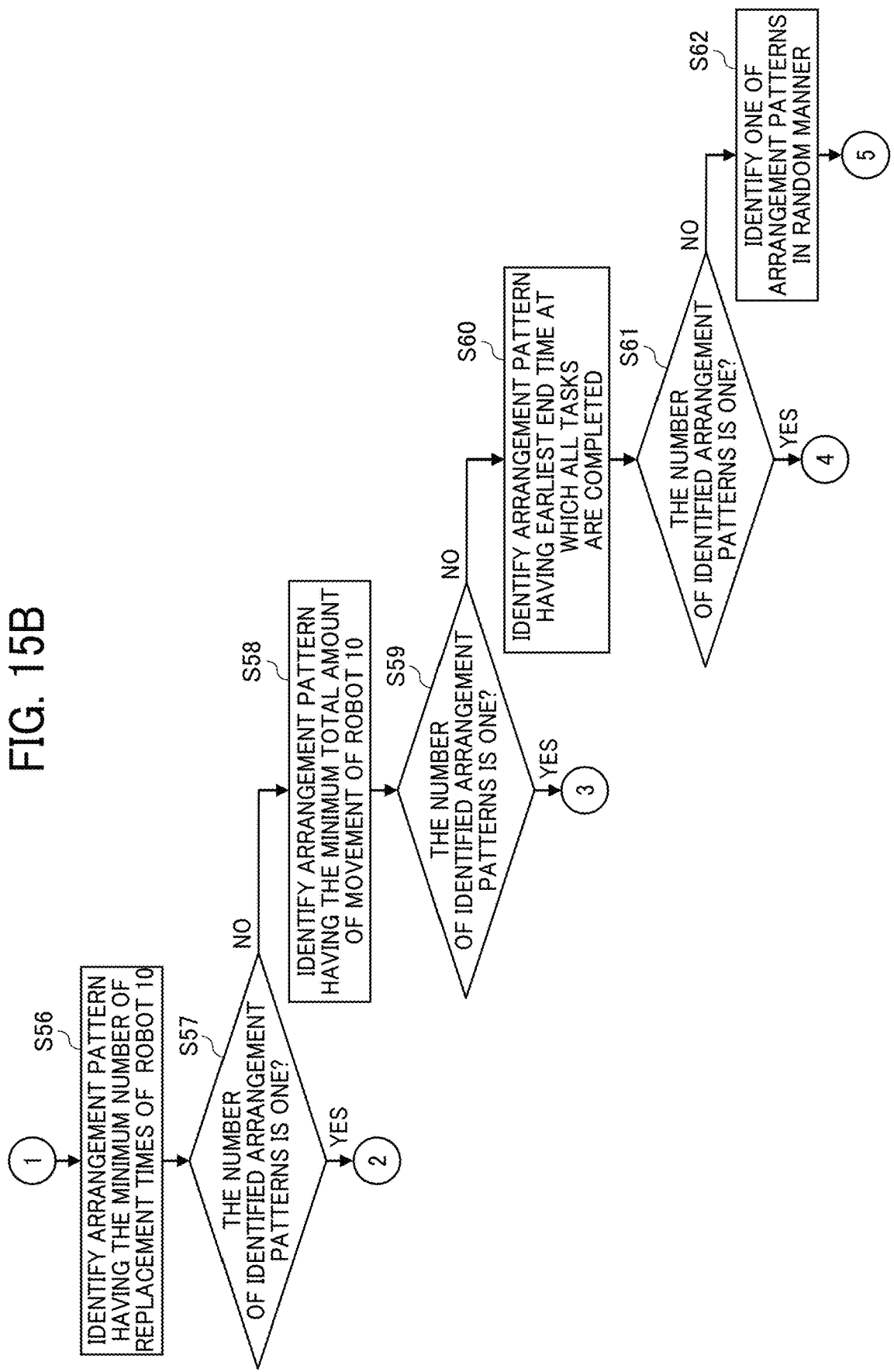

Subsequently, the identifying unit 56 performs a pattern identifying process to identify one of the one or more arrangement patterns generated in step S35 based on the total amount of movement and the final amount of battery remaining calculated in step S36 (step S37). The pattern identifying process performed by the identifying unit 56 is described below in detail, with reference to FIG. 15A and FIG. 15B (FIG. 15). FIG. 15A and FIG. 15B (FIG. 15) is a flowchart illustrating an example of the pattern identifying process performed by the identifying unit 56 according to the present embodiment of the disclosure.

First, the identifying unit 56 determines whether there is an arrangement pattern in which the final amount of battery remaining calculated in step S36 is equal to or greater than a threshold value X set in advance (step S51). When there is one or more arrangement patterns in each of which the final amount of battery remaining calculated in step S36 is equal to or greater than the threshold value X set in advance (YES in step S51), the process proceeds to step S53. The threshold value X is set based on, for example, an estimated amount of battery consumption that is to be used by the robot 10 to execute all the inspection tasks and to return to the charging station 150 after completing all the inspection tasks. In addition to or in alternative to the above-mentioned estimated amount of battery consumption, the threshold value X may be set based on a site range of the target site, for example. That is, the threshold value X is set in advance in order to prevent the robot 10 from stopping traveling or operating in the target site due to shortage of the battery remaining.

On the other hand, when there is no arrangement pattern in which the final amount of battery remaining is equal to or greater than the threshold value X (NO in step S51), the process performed by the identifying unit 56 proceeds to step S52. In step S52, the identifying unit 56 changes the value of the threshold value X so as to be smaller than the value used in step S51, and repeats the process from step S51.

In step S53, when the number of arrangement patterns in which the final amount of battery remaining is equal to or greater than the threshold value X is one (YES in step S53), the identifying unit 56 successfully specifies the one arrangement pattern, and thus the pattern identifying process ends. On the other hand, when there are a plurality of arrangement patterns in each of which the final amount of battery remaining is equal to or greater than the threshold value X (NO in step S53), the process performed by the identifying unit 56 proceeds to step S54.

Subsequently, the identifying unit 56 identifies one or more arrangement patters among from the plurality of arrangement patterns in each of which the final amount of battery remaining is equal to or greater than the threshold value X in manner that each of the one or more arrangement patters has an estimated amount of battery remaining that is equal to or greater than the threshold value X all the time (step S54). The estimated amount of the battery remaining indicates a value of the battery remaining of the robot 10 in executing each inspection task. When the number of arrangement patterns identified in step S54 is one (YES in step S55), the identifying unit 56 successfully identifies the one arrangement pattern, the pattern identifying process ends. On the other hand, when there are a plurality of arrangement patterns identified in step S54 (NO in step S55), the process performed by the identifying unit 56 proceeds to step S56.

Subsequently, the identifying unit 56 identifies one or more arrangement patters among from the plurality of arrangement patterns identified in step S54 in manner that each of the one or more arrangement patters has the number of replacement times of the robot 10 being the minimum number of times (step S56). When the number of arrangement patterns identified in step S56 is one (YES in step S57), the identifying unit 56 successfully identifies the one arrangement pattern, the pattern identifying process ends. On the other hand, when there are a plurality of arrangement patterns identified in step S56 (NO in step S57), the process performed by the identifying unit 56 proceeds to step S58.

Subsequently, the identifying unit 56 identifies one or more arrangement patters among from the plurality of arrangement patterns identified in step S56 in manner that each of the one or more arrangement patters has the total amount of movement, which is calculated in step S36, being the minimum amount (step S58). When the number of arrangement patterns identified in step S58 is one (YES in step S59), the identifying unit 56 successfully identifies the one arrangement pattern, the pattern identifying process ends. On the other hand, when there are a plurality of arrangement patterns identified in step S58 (NO in step S59), the process performed by the identifying unit 56 proceeds to step S60.

Subsequently, the identifying unit 56 identifies one or more arrangement patters among from the plurality of arrangement patterns identified in step S58 in manner that each of the one or more arrangement patters has an end time that is the earliest (step S60). When the number of arrangement patterns identified in step S60 is one (YES in step S61), the identifying unit 56 successfully identifies the one arrangement pattern, the pattern identifying process ends. On the other hand, when there are a plurality of arrangement patterns identified in step S60 (NO in step S61), the process performed by the identifying unit 56 proceeds to step S62.

Then, the identifying unit 56 randomly identifies one among the plurality arrangement patterns identified in step S60 (step S62). As described above, the identifying unit 56 identifies a single arrangement pattern on the basis of the respective conditions of the amount of battery remaining (the final amount of battery remaining and the estimated amount of battery remaining in executing each inspection task), the number of replacement times of robots 10, and the total amount movement of the robot 10, and the end time of all the inspection tasks, in each generated arrangement patterns. When failing to identify the single arrangement patters by using the conditions, the identifying unit 56 randomly identifies one among from the remaining arrangement patterns.

Figure 17:
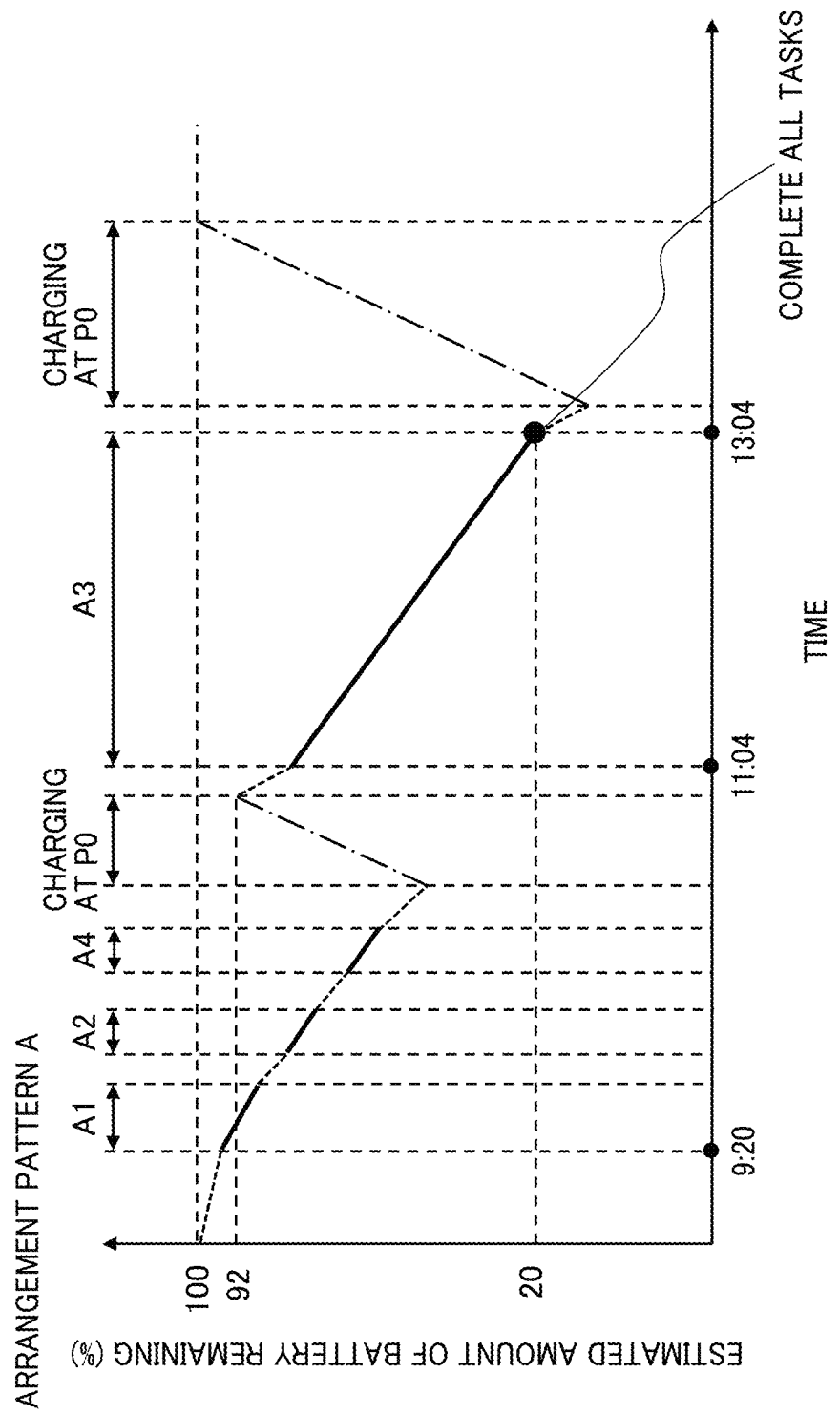
FIG. 17 is a diagram illustrating an example of transition of an estimated amount of battery remaining in an arrangement pattern, according to the one of the embodiments of the disclosure.

A specific example of the plurality of arrangement patterns generated by the generating unit 54 and specific example of the conditions used for the pattern identifying process performed by the identifying unit 56 are described, with reference to FIG. 16 and FIG. 17. FIG. 16 is a diagram for explaining an example of the plurality of arrangement patterns generated by the generating unit 54 and a value corresponding to each specific condition in each arrangement pattern, according to the present embodiment. In FIG. 16, four arrangement patterns (arrangement patterns A to D) generated by the generating unit 54 are illustrated as examples.

As described above, the task A1 and the task A3 are inspection tasks having start times, and thus are arranged to the same time zone in each arrangement pattern. On the other hand, since being inspection tasks that do not have a start time, the task A2 and the task A4 are arranged to a different time zone in each arrangement pattern.

In addition, in FIG. 16, values each corresponding to one of the specific conditions used by the identifying unit 56 is illustrated in each arrangement pattern to which the tasks A1 to A4 are arranged. In the process illustrated in FIG. 15A and FIG. 15B (FIG. 15), when the threshold value X is set to 20%, the arrangement pattern identified by the identifying unit 56 is the arrangement pattern A. Compared with the other arrangement patterns, the estimated amount of battery remaining is large, the total amount of movement is small, and the end time is early in the arrangement pattern A, and thus all the inspection tasks are completely executed most efficiently.

FIG. 17 is a diagram illustrating an example of transition of the estimated amount of battery remaining in the arrangement pattern A, according to the present embodiment. Regarding the amount of battery remaining of the robot 10, the battery is consumed in the movement operation of moving, or travelling, from a position to another position where each inspection task is executed and in the execution operation of executing each task. When there is an interval between inspection tasks, the robot 10 moves to the position P0 of the charging station 150 and charges the battery 120. In the example of FIG. 17, a period during which the battery is consumed between inspection tasks (between an end of an inspection task and a start of another inspection task) is a time period of movement to a position of the next inspection task or the position P0 of the charging station 150. That is, the generating unit 54 sets a time to cause the robot 10 to travel to the charging station 150 and a charging time to charge the robot 10 at the charging station 150 in each arrangement pattern, according to the estimated amount of battery remaining of the robot 10 and the time intervals between the inspection tasks.

The charging station 150 may include a facility for washing the robot 10 or a facility for maintaining the robot 10 performed by an administrator (for example, a maintenance station), in addition to a charging facility. In this case, the generating unit 54 may set one charging station 150 as a movement destination among from the plurality of charging stations 150 installed in the target site based on the operation state of the robot 10 and the facility in the charging station 150 in addition to the position of the robot 10 and the position of the charging station 150.

As described above, the schedule management server 50 takes into account the travel time to be used to travel between the inspection tasks and the corresponding amount of battery consumption, in addition to the execution time to be used to execute each inspection task and the estimated amount of battery consumption. In addition, the schedule management server 50 identifies the arrangement pattern in which the inspection tasks are arranged in a manner that the estimate amount of battery remaining is equal to or greater than the predetermined value all the time (in the example of FIG. 15A and FIG. 15B (FIG. 15), equal to or greater than the threshold value X), resulting in preventing the robot 10 from failing to execute the inspection tasks in the middle of the schedule. In some embodiments, the robot 10 includes the battery 120 as a main battery that performs main power supply and a spare battery that performs auxiliary power supply, and the schedule management server 50 may set, for generating an arrangement pattern, control of the robot 10 such that the power supply is switched to the power supply from the spare battery when an estimated amount of battery remaining of the main battery is equal to or less than a predetermined value.

Referring again to FIG. 14, in step S38, the transmission/reception unit 51 of the schedule management server 50 transmits, to the communication terminal 70, arrangement pattern information indicating the arrangement pattern identified in step S37. The communication terminal 70 causes the display 706 to display a display screen indicating the received arrangement pattern information so that the administrator A confirms the information. Accordingly, the administrator A checks and confirm the displayed arrangement pattern information, selects whether to accept the arrangement pattern identified by the schedule management server 50, and inputs a selection result to the communication terminal 70.

Then, when the transmission/reception unit 51 of the schedule management server 50 receives an acceptance notification indicating acceptance of the arrangement pattern transmitted from the communication terminal 70 (YES in step S39), the processing proceeds to step S40. On the other hand, in a case where the transmission/reception unit 51 does not receive the acceptance notification in relation to the arrangement pattern or a rejection notification indicating that the arrangement pattern, which is transmitted from the communication terminal 70, is rejected (NO in step S39), the processing proceeds to step S37, and the pattern identifying processing is performed again. In this case, the identifying unit 56 performs the pattern identifying processing on the remaining arrangement patterns excluding the one identified in the processing previously performed.

In step S40, the registration unit 58 registers the arrangement pattern corresponding to the acceptance notification received in step S39 in the schedule management DB 5005 (see FIG. 11) as the schedule information indicating the schedule for executing the plurality of inspection task. More specifically, the registration unit 58 registers the schedule information corresponding to the arrangement pattern in association with the user ID of the administrator A, "w001". The registration unit 58 registers the schedule information in which the start time of each inspection task corresponding to the arrangement pattern, the task ID, and the robot ID of the robot 10 that is to execute each inspection task are associated with each other.

As described above, the schedule management server 50 generates and registers the schedule arranged such that all the specified inspection tasks are efficiently executed by the robot 10 based on the task information including the time information, the estimated amount of battery consumption, and the like related to the designated inspection tasks.

Referring again to FIG. 12, the transmission/reception unit 51 of the schedule management server 50 transmits to the communication terminal 70 a registration completion notification indicating that the schedule registration is completed (step S19). The registration completion notification includes the schedule information registered in step S40. Accordingly, the transmission/reception unit 71 of the communication terminal 70 receives the schedule information transmitted from the schedule management server 50.

Then, the display control unit 73 of the communication terminal 70 causes the display 706 to display a schedule checking screen 800 indicating the schedule information received in step S19 (step S20). FIG. 18 is a diagram illustrating an example of the schedule checking screen 800, according to the present embodiment of the disclosure. A schedule checking screen 800 illustrated in FIG. 18 is a display screen indicating a schedule registered by the schedule management server 50. The administrator A checks the schedule for execution of the inspection tasks using the schedule checking screen 800.

The schedule displayed on the schedule checking screen 800 is associated with the scheduled start time and the scheduled end time of each inspection task, each inspection task name, and the robot name of the robot 10 that executes each inspection task. The schedule checking screen 800 also includes progress icons 810 (810a, 810b, 810c, and 810d) indicating whether the corresponding inspection task has been completed or not. When each inspection task is completed, the progress icon 810 is switched from "UNCOMPLETED" to "COMPLETED".

Further, the schedule checking screen 800 includes a "MODIFY" button 820 that is pressed when the administrator A modifies (reschedules) the schedule being displayed. Pressing the "MODIFY" button 820 allows the administrator A to change the scheduled start time or the scheduled end time of each inspection task or the robot 10 to execute each inspection task. The schedule information modified by the administrator A is transmitted from the communication terminal 70 to the schedule management server 50 and registered in the schedule management DB 5005.

As described above, the communication terminal 70 displays the schedule arranged based on the task information including the time information and the estimated amount of battery consumption related to each inspection task designated, or specified, using the task designation screen 600, thereby allowing the administrator A to view (check) the schedule of the designated inspection tasks.

The schedule checking screen 800 may display a plurality of pieces of schedule information (schedules) corresponding to a plurality of arrangement patterns as illustrated in FIG. 16, for example. In this case, the administrator A selects a desired schedule from the plurality of schedules displayed and registers the selected schedule in the schedule management server 50. In addition, the schedule checking screen 800 may display, for example, values corresponding to various specific conditions as illustrated on the right side of FIG. 16 or transition of the estimated amount of battery remaining as illustrated in FIG. 17 together with the schedule. In this case, the administrator A may grasp the behavior (state) of the robot 10 that executes each inspection task, such as the amount of battery remaining or the amount of movement of the robot 10.

In the above description, the task designation screen 600 and the schedule checking screen 800 are displayed on the display unit such as the display 706 by the display control unit 73 of the communication terminal 70. In some embodiments, each of the display screen may be controlled or displayed by processing of the schedule management server 50. For example, when various display screens are displayed using a general web browser or a dedicated application, the task designation screen 600 or the schedule checking screen 800 is displayed on the display unit such as the display 706 by transmitting the display screen data from the transmission/reception unit 51 of the schedule management server 50 to the communication terminal 70 in the processing of step S14 or step S19. In this case, the transmission/reception unit 51 of the schedule management server 50 functions as a display control unit.

Figure 27:
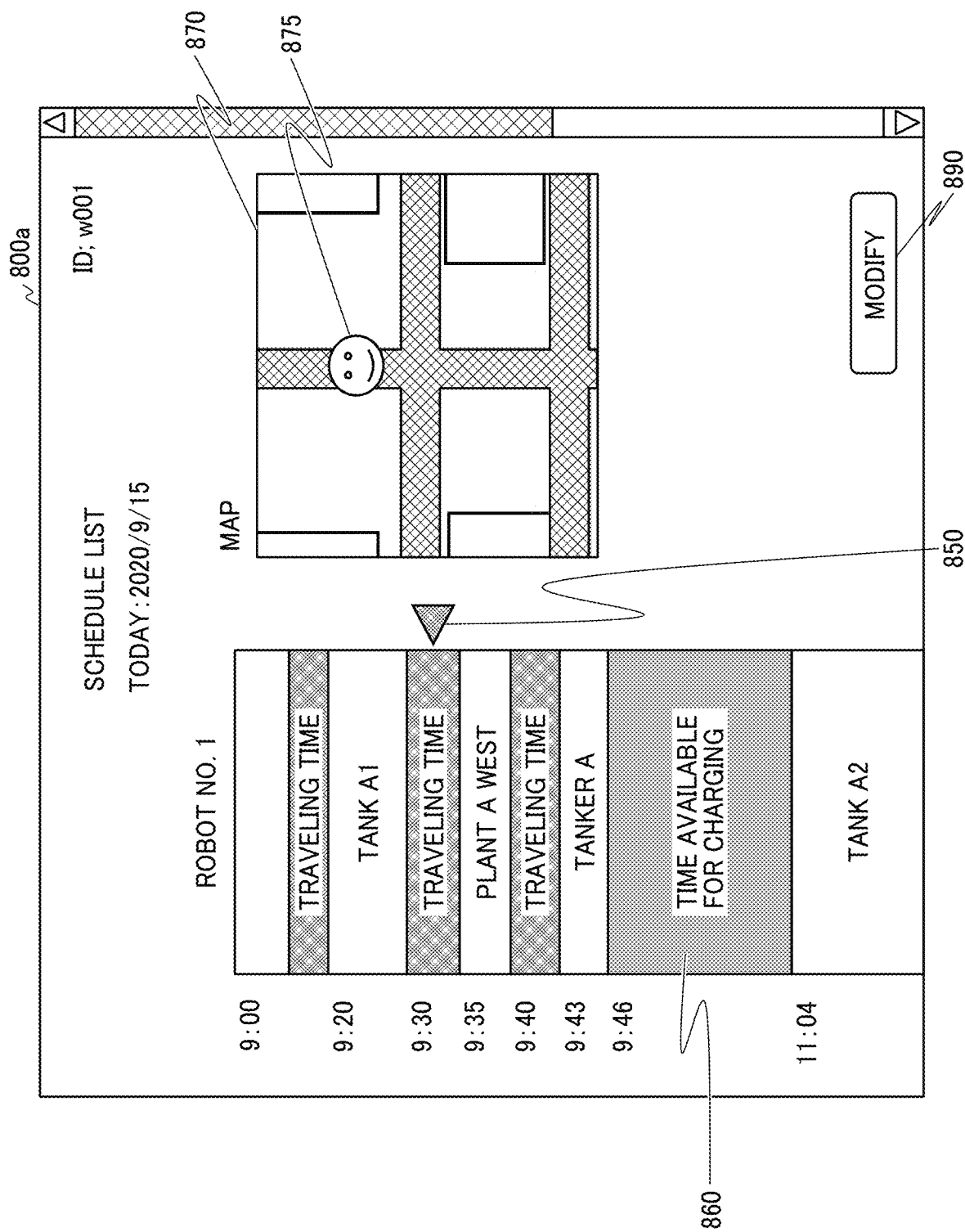
FIG. 27 is a diagram illustrating an example of a modification of the schedule checking screen according to the one of the embodiments of the disclosure.

FIG. 27 is a diagram illustrating an example of modification of the schedule checking screen according to the present embodiment. A schedule checking screen 800a illustrated in FIG. 27 is a display screen that allows the administrator A to add or change a schedule while visually checking a status of each inspection task to be executed by the robot 10. The schedule checking screen 800a indicates the schedule information received in step S19 in time series, and includes a state display image 850 indicating the operation state of the robot 10 to which the inspection task is assigned, and a display image 860 displaying a possible time for charging the robot 10. When the robot 10 is actually being charged, the display image 860 is switched to a display indicating that charging is being performed. For example, a displayed color of the display image 860 may be switched to another color during the charging such that the administrator A visually recognizes.

In addition, the schedule checking screen 800a includes a map image 870 indicating a current position of the robot 10 in the site, a current position display image 875 displayed so as to be superimposed on the current position of the robot 10 on the map image 870, and a "MODIFY" button 890 to be pressed when the administrator A modifies the schedule being displayed. The administrator A may check an execution status of a current inspection task by checking the status display image 850 and the current position display image 875 on the map image 870. In addition to the map image 870 or in alternative to the map image 870, the schedule checking screen 800a may display a captured image that is captured by the robot 10 at a current position of the robot 10.

In addition, in FIG. 12, the transmission/reception unit 51 of the schedule management server 50 transmits, to the robot 10, a task execution request indicating a request to execute an inspection task according to the schedule registered in step S40 (step S21). The task execution request includes start time information indicating a start time of each inspection task and task information corresponding to an inspection task to be executed. Accordingly, the transmission/reception unit 31 of the control device 30 of the robot 10 receives the task execution request transmitted from the schedule management server 50.

Then, the travel control unit 36 of the control device 30 causes the robot 10 to travel so as to start the inspection task at the start time indicated by the received start time information. When arriving at an execution position (position) of the inspection task corresponding to the position information indicated in the received task information, the control device 30 starts executing the inspection task at the start time. The control device 30 executes processing corresponding to the processing content indicated in the received task information at the execution position of the inspection task. For example, when the processing content is "capturing an image," the imaging control unit 37 image capturing processing on an inspection target object corresponding to the inspection task.

As described above, the robot 10 efficiently executes one or more inspection tasks designated by the administrator A according to the schedule registered by the schedule management server 50. In step S21, with respect to the task execution request transmitted from the schedule management server 50 to the robot 10, the task information of all the inspection tasks may be transmitted at once, or the task information corresponding to each of the inspection tasks may be transmitted individually in an order of start time, when the corresponding start time of the inspection task is approaching.

Figure 19:
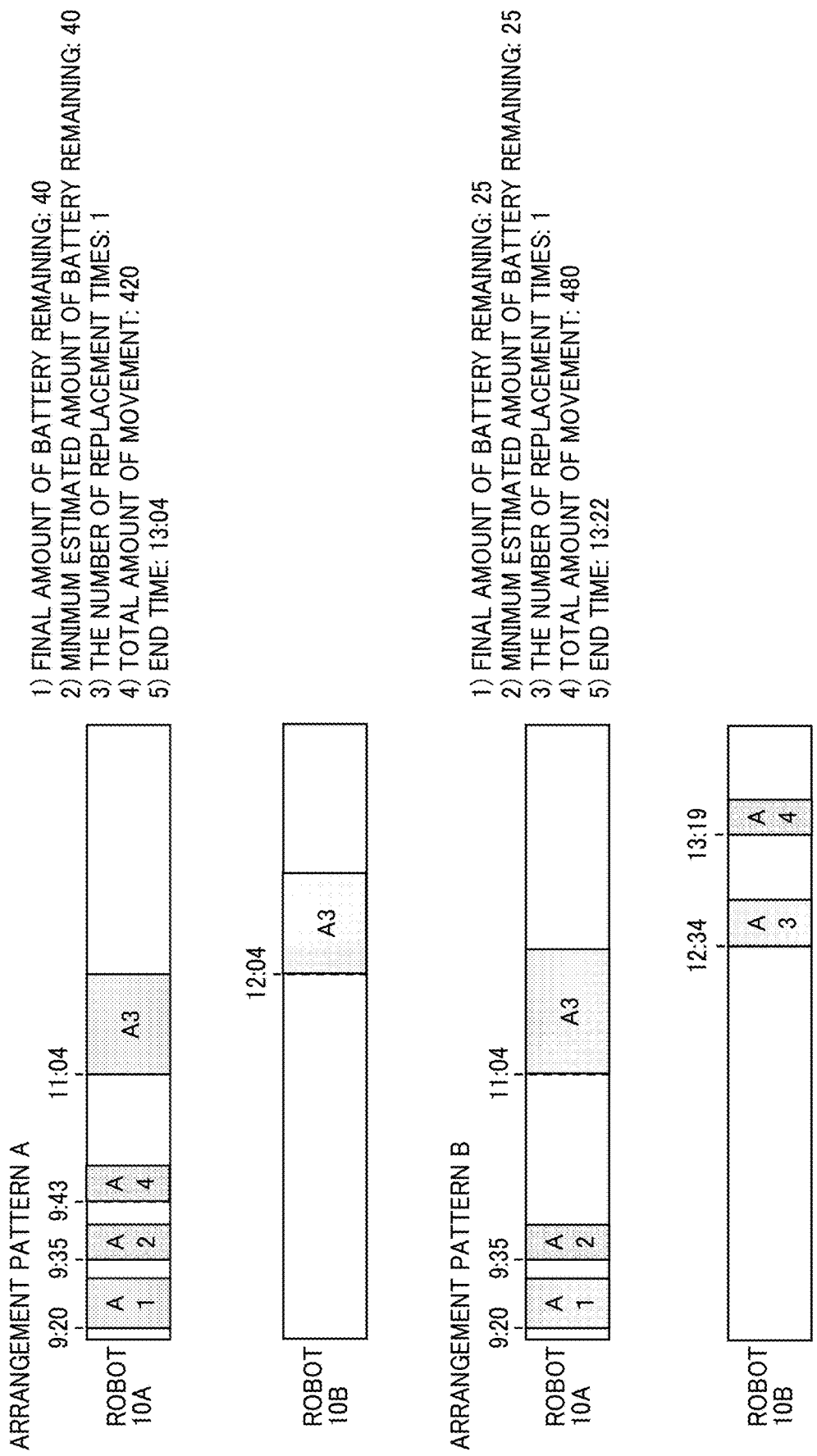
FIG. 19 is a diagram illustrating an example of arrangement patterns in each of which a plurality of inspection tasks is executed using a plurality of robots and values corresponding to specific conditions in each arrangement pattern, according to the one of the embodiments of the disclosure.

Example in which a Plurality of Robots are Used:

An example of the arrangement pattern in which a plurality of inspection tasks is assigned to a plurality of robots 10 is described, with reference to FIG. 19. FIG. 19 is a diagram illustrating an example of arrangement patterns in each of which the plurality of inspection tasks is executed using the plurality of robots 10 and values corresponding to specific conditions in each arrangement pattern, according to the present embodiment. In FIG. 19, two arrangement patterns (arrangement pattern A and arrangement pattern B) in each of which tasks A1 to A4 are assigned to two robots 10 (10A and 10B) are illustrated.

As illustrated in FIG. 19, in each of the arrangement pattern A and the arrangement pattern B, the task A3 is distributed to be assigned to the robot 10A and the robot 10B. For example, in the arrangement pattern A, first one hour of an execution time of the task A3, which takes two hours to be completely executed, is allocated in association with the robot 10A, and the remaining one hour of the execution time is allocated in association with the robot 10B. In the arrangement pattern B, first one hour and half of the execution time of the task A3 is allocated in association with the robot 10A, and the remaining of 30 minutes is allocated in association with the robot 10B. In addition, in the arrangement pattern B, the task A4, which is assigned to the robot 10A in the arrangement pattern A, is assigned to the robot 10B.

As described above, the generating unit 54 assigns the specified inspection tasks to the plurality of robots 10, thereby increasing types or the number of arrangement patterns in each of which all the inspection tasks are arranged. In addition, in the arrangement pattern A and the arrangement pattern B, each value of the amount of battery remaining (the final amount of battery remaining and the estimated amount of battery remaining) of the robot 10 is higher than that of the arrangement patterns illustrated in FIG. 16. That is, since the schedule management server 50 assigns the specified inspection tasks to the plurality of robots 10, the risk of occurrence of an abnormality, such as insufficient of the battery remaining while the robot 10 is executing each inspection task, may be reduced.

In addition, for example, when the threshold value X is set to 20% in the process illustrated in FIG. 15A and FIG. 15B (FIG. 15), the identifying unit 56 identifies the arrangement pattern A among the arrangement pattern A and the arrangement pattern B. Compared with the arrangement pattern B, the estimated amount of battery remaining is larger, the total amount of movement is less, and the end time is earlier in the arrangement pattern A, and thus all the inspection tasks are completely executed efficiently.

Figure 20:
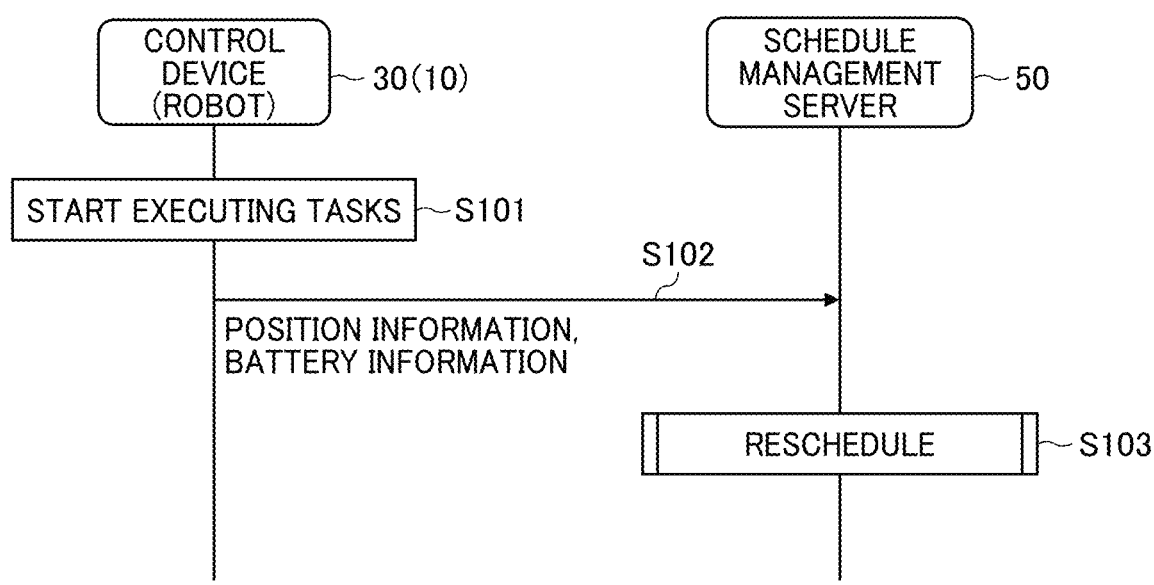
FIG. 20 is a sequence diagram illustrating an example of process of changing a schedule (rescheduling process) in the scheduling system according to the one of the embodiments of the disclosure.
Figure 21:
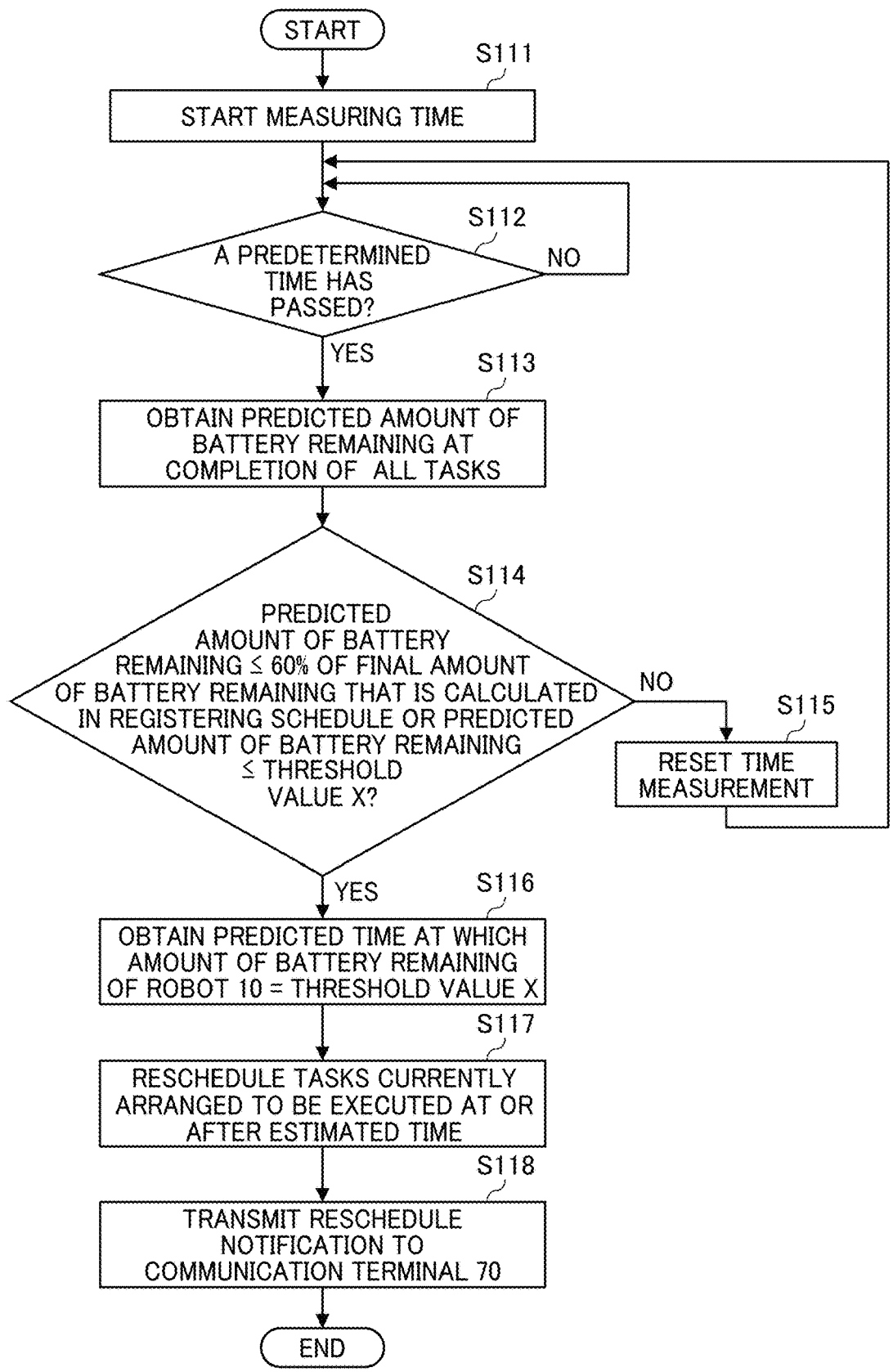
FIG. 21 is a flowchart illustrating an example of the rescheduling process performed by the schedule management server according to the one of the embodiments of the disclosure.
Figure 22:
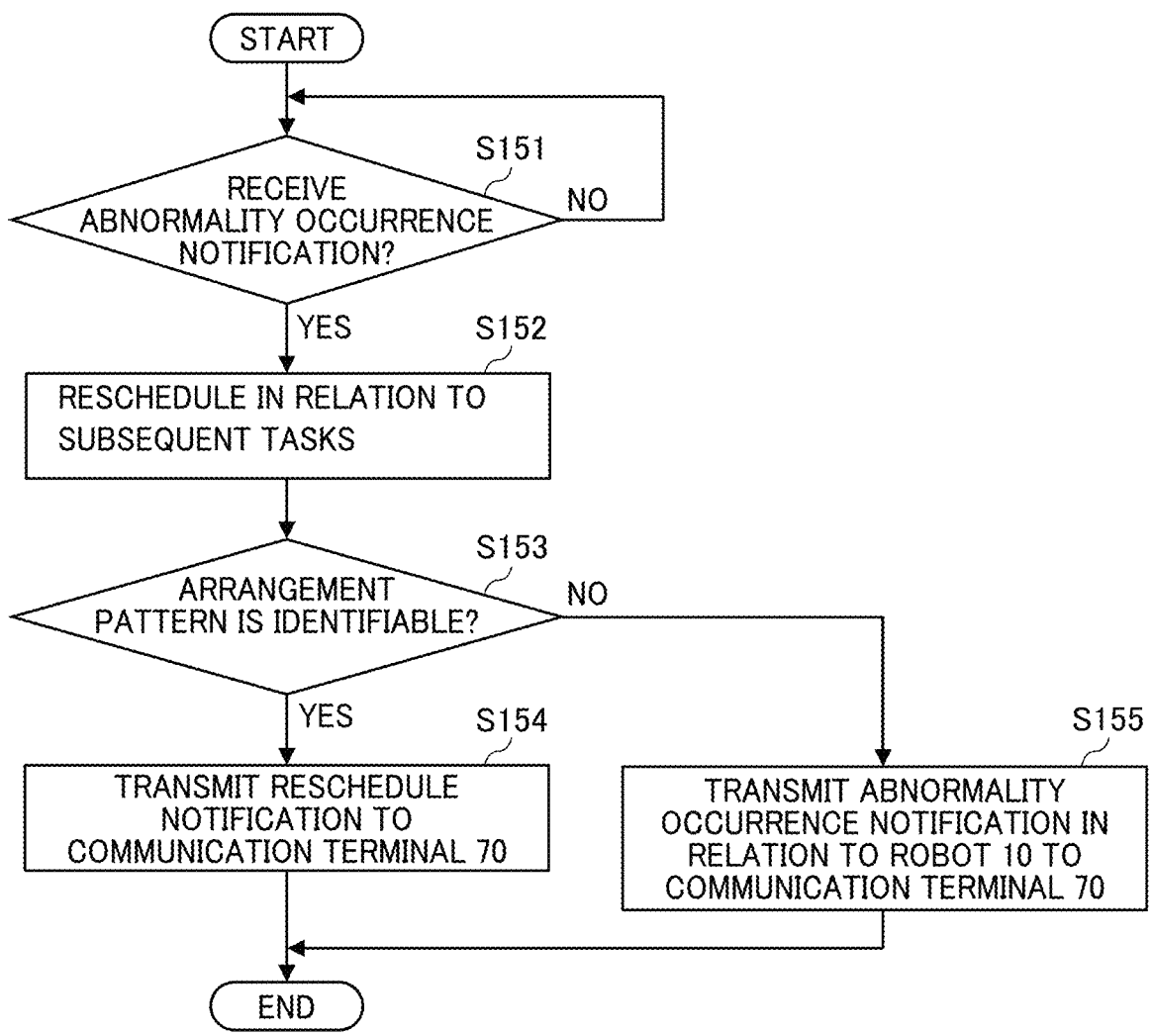
FIG. 22 is a flowchart illustrating an example of a rescheduling process performed by the schedule management server in case that an abnormality occurs in relation to the robot, according to the one of the embodiments of the disclosure.

Rescheduling Process:

Next, a process of changing a registered schedule performed by the schedule management server 50 according to the state of the robot 10, which is to execute the inspection tasks is described with reference to FIG. 20 to FIG. 22. FIG. 20 is a sequence diagram illustrating an example of process of changing a schedule (rescheduling process) in the scheduling system according to the present embodiment of the disclosure.

As illustrated in step S22 of FIG. 12, the robot 10 starts executing the inspection task in response to the task execution request transmitted from the schedule management server 50 (step S101). The battery information acquisition unit 33 acquires the battery information indicating the remaining amount of the battery 120 at any time or periodically. In addition, the position information acquisition unit 34 acquires the position information indicating a current position of the robot 10 at any time or periodically. Then, the transmission/reception unit 31 of the control device 30 transmits the battery information acquired by the battery information acquisition unit 33 and the position information acquired by the position information acquisition unit 34 to the schedule management server 50 (step S102). Accordingly, the transmission/reception unit 51 of the schedule management server 50 receives the position information and the battery information transmitted from the robot 10.

Then, the schedule management server 50 executes rescheduling process according to the state of the robot 10 (step S103). The rescheduling process performed by the schedule management server 50 is described in detail, with reference to FIG. 21. FIG. 21 is a flowchart illustrating an example of the rescheduling process performed by the schedule management server 50 according to the present embodiment of the disclosure.

First, the measurement unit 61 starts measuring time by using the timer 517 from a time when execution of the specified tasks are started (step S111). When a predetermined time has passed (YES in step S112), the process proceeds to step S113. The measurement unit 61 repeats the processing of step S112 until the predetermined time has passed (NO in step S112).

Subsequently, based on the battery information received in step S102 and the estimated amount of battery consumption corresponding to the subsequent inspection tasks, the calculation unit 55 calculates a predicted amount of battery remaining that is the estimated amount of battery remaining at the completion of all the inspection tasks (step S113). Since the predicted amount of battery remaining calculated using a received actual amount of battery remaining, the predicted amount of battery remaining may be different from the final amount of battery remaining. That is, the predicted amount of battery remaining indicates a final amount of battery remaining predicted based on an amount of battery remaining of the robot 10 in executing the inspection tasks.

Subsequently, the determination unit 53 determines whether the predicted amount of battery remaining calculated in step S113 is equal to or less than 60% of the final amount of battery remaining calculated at the time of schedule registration process in step S36 in FIG. 14, or whether the predicted amount of battery remaining is equal to or less than the threshold value X (step S114). The value of the condition used for the comparison between the predicted amount of battery remaining and the final amount of battery remaining calculated at the time of schedule registration is not limited to 60% or less, and may be any value as long as usable to determine that the actual amount of battery remaining is less than the estimated amount of battery remaining that is estimated at the time of schedule registration. The threshold value X may be the same value as the threshold value used in the above-described arrangement pattern identifying process (see FIG. 15A and FIG. 15B (FIG. 15)), or may be a different value.

When the determination unit 53 determines that the predicted amount of battery remaining satisfies the condition in step S114 (YES in step S114), the process proceeds to step S116. On the other hand, when the determination unit 53 determines that the predicted amount of battery remaining does not satisfy the condition in step S114 (NO in step S114), the process proceeds to step S115. In step S115, the measurement unit 61 resets the measurement time measured from step S111 (step S115), and repeats from the processing of step S112.

Subsequently, in step S116, the calculation unit 55 calculates a predicted time that is a time at which the amount of battery remaining of the robot 10 is equal to the threshold X, based on the battery information received in step S102 in FIG. 20 and the estimated amount of battery consumption corresponding to the subsequent inspection tasks. Then, the schedule management server 50 performs the rescheduling process in association with one or more inspection tasks that are currently scheduled to be executed at and after the predicted time calculated in step S116 (step S117). In the rescheduling process, the processing of steps S31 to S36 illustrated in FIG. 14 is performed with respect to the one or more inspection tasks that are currently scheduled to be executed at or after the predicted time, in order to identify the schedule information to be changed. In this case, since the amount of battery remaining of the robot 10 that executes the inspection task is less than expected, the schedule management server 50 identifies an arrangement pattern in which the one or more inspection tasks, which are currently scheduled to be executed at or after the predicted time, are assigned to another robot 10.

Then, the transmission/reception unit 51 transmits a reschedule notification including the schedule information changed in step S117 to the communication terminal 70 (step S118). Accordingly, the transmission/reception unit 71 of the communication terminal 70 receives the schedule change information transmitted from the schedule management server 50. The administrator A checks details indicated in the reschedule notification and grapes the details of the changed schedule. The reschedule notification may be notified in a mail format addressed to the administrator A, or may be notified by a chat format or a voice call by automatic reproduction. In addition, the notification method of the reschedule notification may change according to the importance of the changed details, for example.

As described above, when the actual amount of battery remaining of the robot 10 is less than the estimated amount of battery remaining that is estimated at the time of schedule registration, the scheduling system 1 may flexibly change the execution schedule in association with the inspection tasks in a manner that the inspection tasks are assigned to another robot 10, resulting in successful completion of all of the inspection tasks, which are designated by the administrator A.

Next, a process of changing the registered schedule (rescheduling process) performed in case where an abnormality occurs in relation to the robot 10 that executes the inspection task is described with reference to FIG. 22. In the description of the present embodiment, the occurrence of an abnormality in relation to the robot 10 includes a case where the operation of the robot 10 stopes due to the amount of battery remaining of the robot 10 is low or zero, and a case where the robot 10 fails to move to the destination, which is set by the destination setting unit 35, due to presence of an obstacle or the like in the travelling route. FIG. 22 is a flowchart illustrating an example of a rescheduling process performed by the schedule management server 50 in case that an abnormality occurs in relation to the robot 10, according to the present embodiment of the disclosure. Similar to the process illustrated in FIG. 21, the process illustrated in FIG. 22 is a process performed under a condition in which the robot 10 has already started execution of the assigned inspection tasks.

First, when the transmission/reception unit 51 of the schedule management server 50 receives an abnormality occurrence notification indicating that an abnormality has occurred in relation to the robot 10 (YES in step S151), the process proceeds to step S152. The transmission/reception unit 51 repeats the processing of step S151 until the abnormality occurrence notification is received (NO in step S151).

Subsequently, the schedule management server 50 performs rescheduling process in relation to the one or more subsequent inspection tasks (step S152). In the rescheduling process, the processing of steps S31 to S36 illustrated in FIG. 14 is performed with respect to the inspection tasks that are currently scheduled to be executed at or after the time at which the abnormality occurrence notification is received, in order to identify the schedule information to be changed. In this case, since the abnormality has occurred in the robot 10 that executes the inspection tasks, the schedule management server 50 identifies an arrangement pattern in which the subsequent inspection tasks are assigned to another robot 10.

In step S152 of the rescheduling process, when the identifying unit 56 successfully identifies the arrangement pattern, namely the arrangement pattern is identifiable (YES in step S153), the process proceeds to step S154. Then, the transmission/reception unit 51 transmits a reschedule notification including the schedule information changed in step S152 to the communication terminal 70 (step S154). Accordingly, the transmission/reception unit 71 of the communication terminal 70 receives the schedule change information transmitted from the schedule management server 50. The administrator A checks details indicated in the reschedule notification and grapes the details of the changed schedule.

On the other hand, in step S152 of the rescheduling process, when the identifying unit 56 fails to identify the arrangement pattern in step S153, namely the arrangement pattern is not identifiable (NO in step S153), that is, when there is no arrangement pattern in which the inspection tasks are assigned, the process proceeds to step S155. Then, the transmission/reception unit 51 transmits an abnormality occurrence notification in relation to the robot 10 to the communication terminal 70. Accordingly, the transmission/reception unit 71 of the communication terminal 70 receives the abnormality occurrence notification transmitted from the schedule management server 50. The abnormality occurrence notification allows the administrator A who checks details of the abnormality occurrence to deal with the situation by, for example, manually assigns the inspection tasks to another robot 10 or by going off to the position of the robot 10 with which the abnormality has occurred. The abnormality occurrence notification may be notified in a mail format addressed to the administrator A, or may be notified by a chat format or a voice call by automatic reproduction. In addition, the notification method of the abnormality occurrence notification may change according to the importance of the details, for example.

As described above, when the abnormality occurs in relation to the robot 10 in executing the inspection task, the scheduling system 1 may flexibly change the execution schedule in association with the inspection tasks in a manner that the subsequent inspection tasks are assigned to another robot 10, resulting in successful completion of all of the inspection tasks, which are designated by the administrator A.

Figure 24:
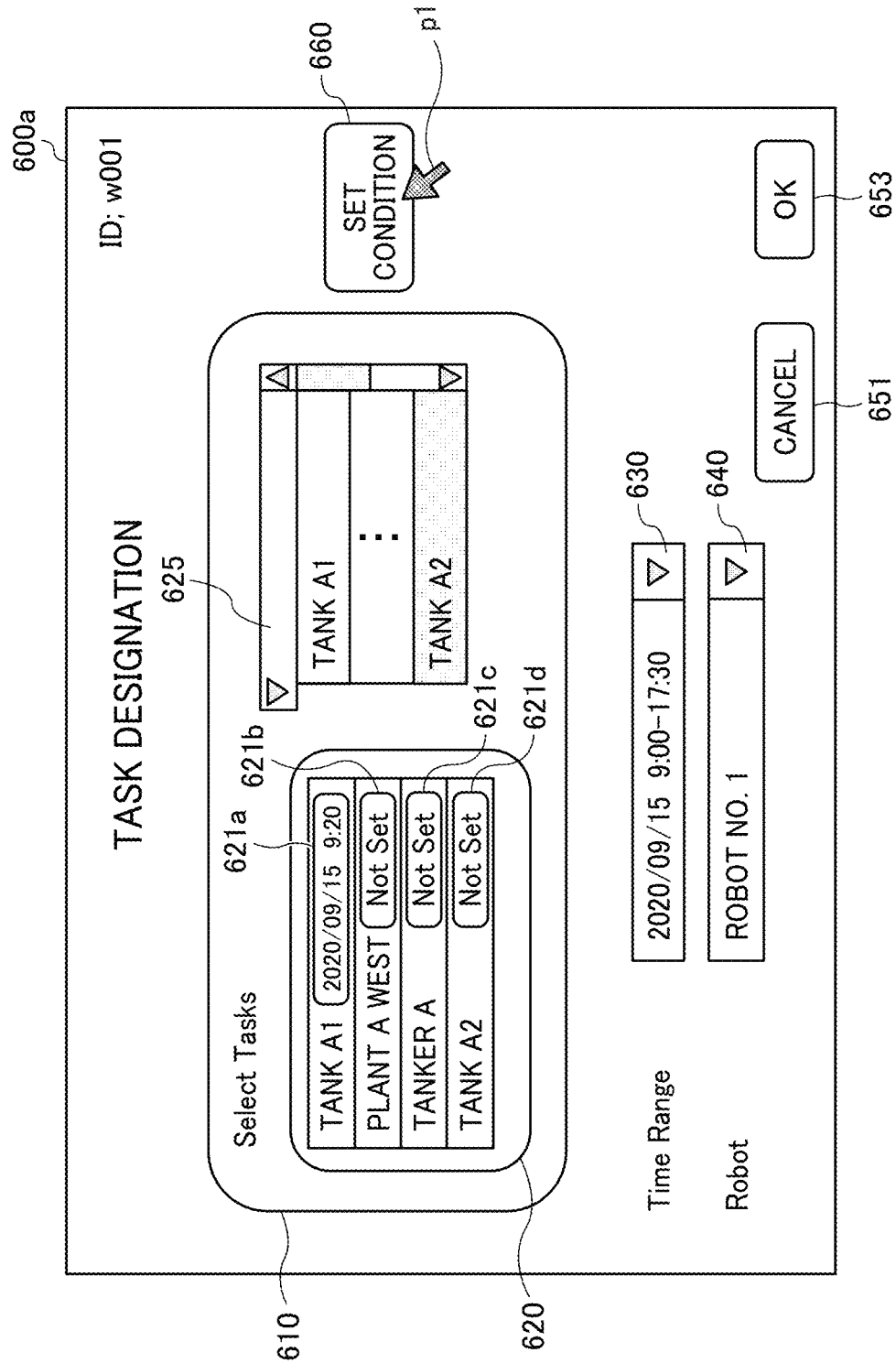
FIG. 24 is a diagram illustrating a modification of the task designation screen according to the one of the embodiments of the disclosure.
Figure 25:
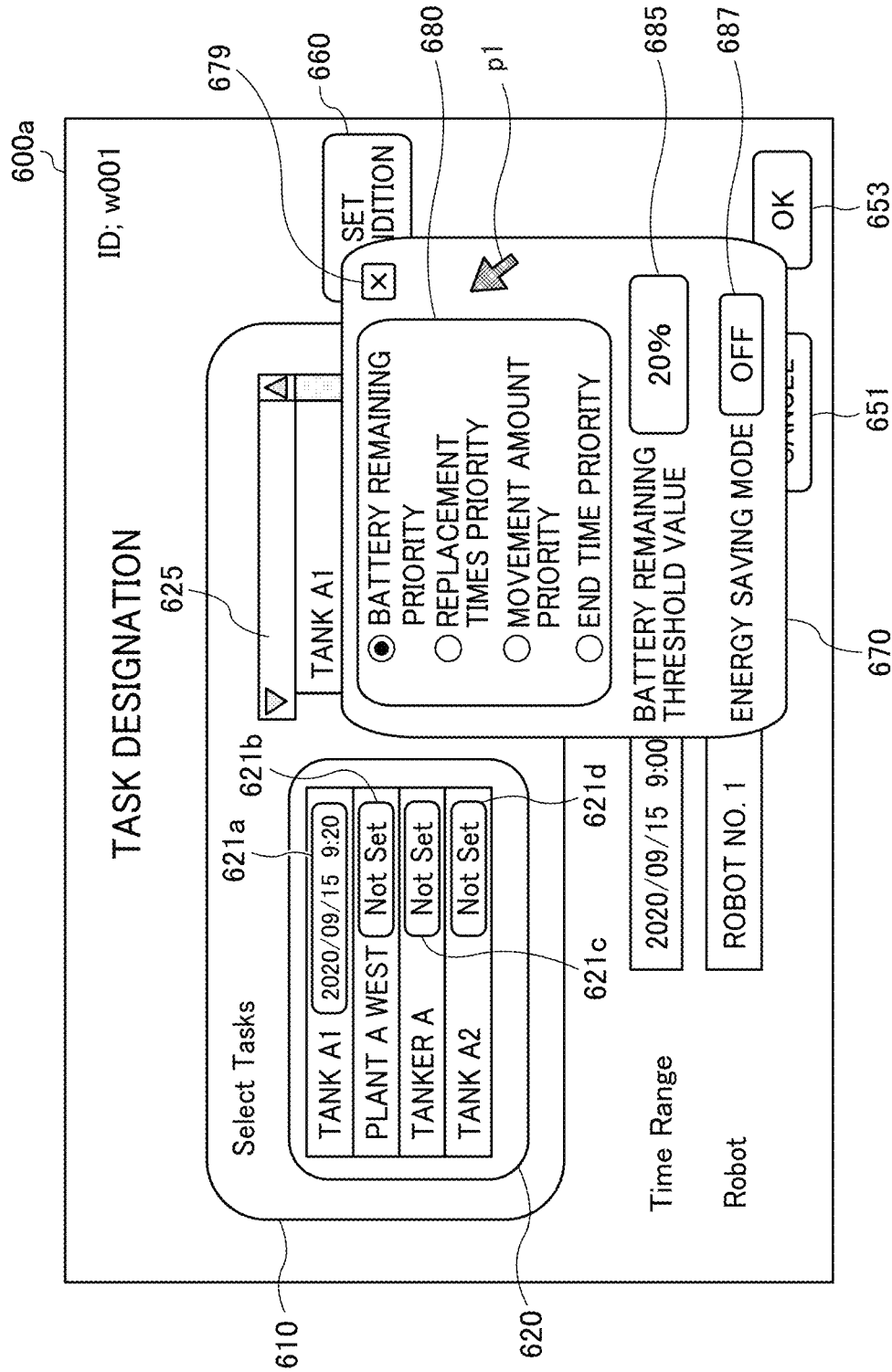
FIG. 25 is a diagram illustrating another modification of the task designation screen according to the one of the embodiments of the disclosure.

Variation in Relation to Schedule Registration:

A description is given below of a modification of the schedule registration process, with reference to FIG. 23 to FIG. 25. FIG. 23 to FIG. 25 illustrates examples in each of which the priority of specific conditions used in the arrangement patterns identifying process as illustrated in FIG. 15A and FIG. 15B (FIG. 15) is settable by the administrator.

FIG. 23 is a conceptual diagram illustrating an example of a specific condition management table, according to the present embodiment of the disclosure. The specific condition management table is a table for managing an arrangement setting detail of specific condition used for identifying the arrangement pattern. The storage unit 5000 stores a specific condition management DB 5006, which is implemented by the specific condition information management table as illustrated in FIG. 23.

The specific condition management table includes data items of setting ID and setting name each for identifying an arrangement setting detail, and arrangement setting detail used for identifying the arrangement pattern in association with each other. The arrangement setting detail indicates the priority of the specific conditions used in the arrangement pattern identifying process as illustrated in FIG. 15A and FIG. 15B (FIG. 15). For example, in an arrangement setting detail of a setting name of "BATTERY REMAINING PRIORITY," a specific condition of final amount of battery remaining and a specific condition of estimated amount of battery remaining have higher priority than other specific conditions. In addition, for example, in an arrangement setting detail of a setting name of "REPLACEMENT TIMES PRIORITY," a specific condition of replacement times has higher priority than other specific conditions.

The condition setting unit 57 sets any one of the setting details indicated in the specific condition management table. Then, the identifying unit 56 performs the identifying process illustrated in FIG. 15A and FIG. 15B (FIG. 15) based on the setting detail set by the condition setting unit 57. That is, in the identifying process illustrated in FIG. 15A and FIG. 15B (FIG. 15), the order of the identifying steps in relation to the conditions (step S51, step S54, step S56, step S58, and step S60) are changed according to the setting detail set by the condition setting unit 57.

FIG. 24 and FIG. 25 are diagrams each illustrating a modification of the task designation screen according to the present embodiment. The task designation screen 600a includes, in addition to the configuration of the task designation screen 600 illustrated in FIG. 13, a "SET CONDITION" button 666 to be pressed when set a specific condition for an arrangement pattern. As illustrated in FIG. 24, when the administrator A presses the "SET CONDITION" button 660, the display control unit 73 displays a condition setting section 670 as illustrated in FIG. 25 on the task designation screen 600a.

The condition setting section 670 includes a priority setting section 680 for setting a priority setting for performing schedule registration, a threshold value input field 685 for inputting a threshold value X of an amount of battery remaining used for an arrangement pattern identifying process, an energy saving mode switching button 687 to be pressed when executing each inspection task in an energy saving mode, and a "close" button 679 to be pressed when closing the condition setting section 670.

In the priority setting section 680, a setting name indicating each setting detail stored in the specific condition management DB 5006 (see FIG. 23) of the schedule management server 50 is displayed. The administrator A may select any one of the setting names displayed in the priority setting section 680. In FIG. 25, the setting of "BATTERY REMAINING PRIORITY" is selected. For example, the administrator A sets the setting of "BATTERY REMAINING PRIORITY" for give priority to an amount of battery remaining of the robot 10 being equal to or greater than a certain amount all the time in preparation for coping with a situation in which an unexpected event occurs in the target site. The energy-saving mode is a mode in which each specified inspection task is executed so that the amount of battery consumption of the robot 10 is reduced as much as possible. When the energy-saving mode is selected via the reception unit 72, the scheduling system 1 reduces a movement speed of the robot 10 to which the inspection task is assigned, or identifies an arrangement pattern in which the amount of movement is small as much as possible.

When the designation of the inspection tasks and the setting detail is received via the reception unit 72 using the task designation screen 600a, the transmission/reception unit 71 of the communication terminal 70 transmits a schedule registration request including designated setting information indicating the designated setting detail to the schedule management server 50 in step S17 in FIG. 12. Then, the condition setting unit 57 of the schedule management server 50 reads the setting detail corresponding to the designated setting information received by the transmission/reception unit 51 from the specific condition management DB 5006, and sets the read setting detail. Then, the identifying unit 56 performs the identifying process of the arrangement pattern according to the priority of the specific conditions based on the setting detail set by the condition setting unit 57.

As described above, the scheduling system 1 identifies the arrangement pattern according to the priority set by the administrator A for performing the schedule registration, and thus the schedule that satisfies the request from the administrator A is successfully registered. The number of setting details stored in the specific condition management table and the type and priority of the specific condition included in each setting detail are not limited thereto, and may be appropriately added or changed according to a scale or a type of the target site, performance of the robot 10, a type of each task, or the like. The specific condition may include, for example, a condition in which a cumulative travel distance (movement distance) of each robot 10 is kept constant in consideration of a time to perform maintenance on the robot 10 or deterioration of the travel control device 15, for example. In addition, in case where the plurality of charging stations 150 is set in the target site, the specific condition may include a condition for determining a position of the charging station 150 that is a destination in consideration of a subsequent task executed by the robot 10. Further, the specific condition may include a condition for determining the robot 10 to which the inspection task is assigned or a battery to be used, in consideration of the state of a plurality of batteries provided in the robot 10, such as a capacity or type of each battery provided in the robot 10, the presence or absence of a spare battery for performing auxiliary power supply, or a use state of the spare battery (presence or absence of switching from the main battery).

Figure 28:
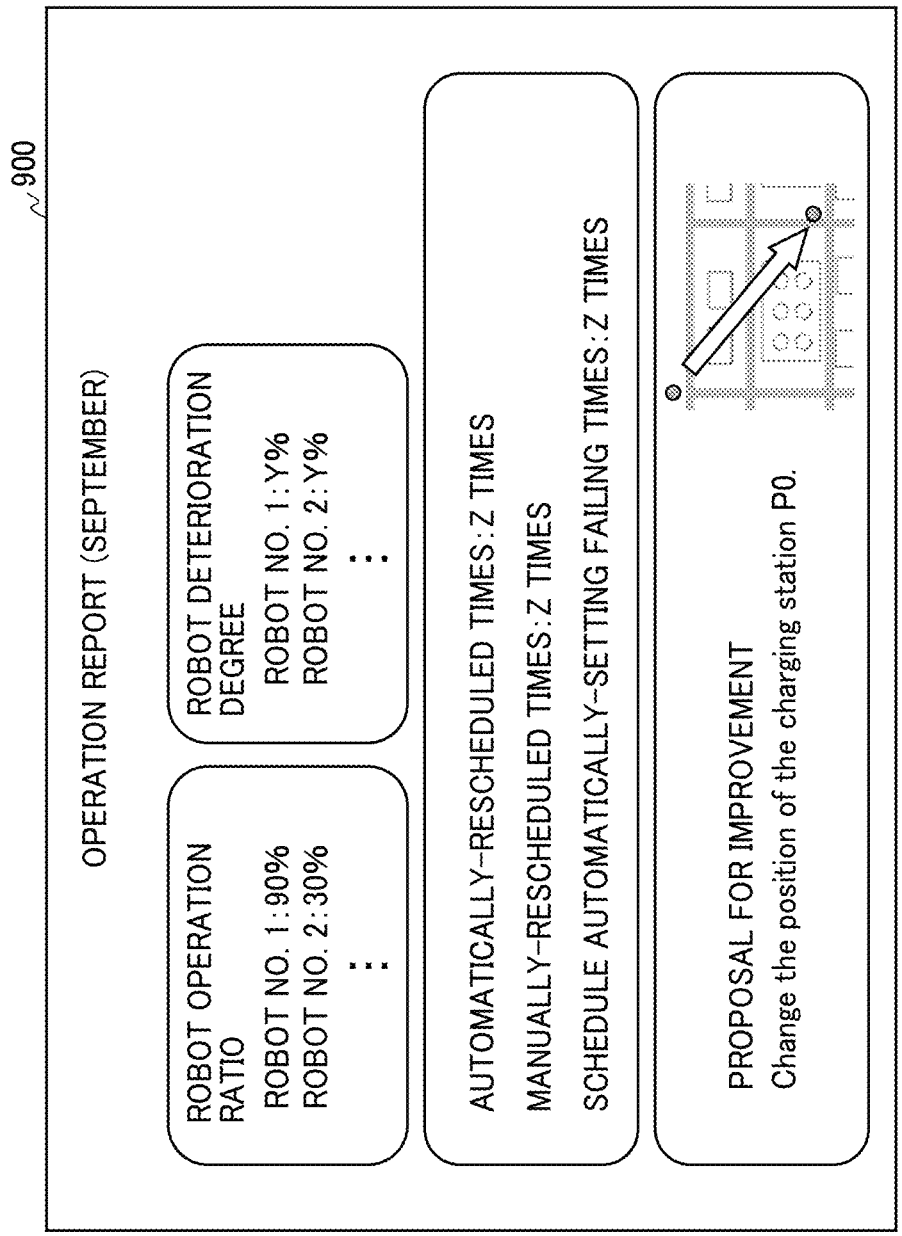
FIG. 28 is a diagram illustrating an example of an operation report notified to the communication terminal according to the one of the embodiments of the disclosure.

Operation Report:

A description is given below of an operation report that indicates a result of schedule processing and is notified to the administrator, with reference to FIG. 28. FIG. 28 is a diagram illustrating an example of an operation report 900 notified to the communication terminal 70 according to the present embodiment. The operation report 900 illustrated in FIG. 28 is a report for notifying the administrator of statistics of the result of the schedule processing performed by the schedule management server 50 in a preset period such as a month unit or a week unit. In the example of FIG. 28, the statistical result of the schedule processing is on a monthly basis (for example, September). The schedule management server 50 performs statistical processing in relation to the schedule processing for a preset period, and transmits the result to the communication terminal 70 as the operation report 900. The operation report 900 may be notified in a mail format addressed to the administrator, or may be notified in a chat format or by a voice call by automatic reproduction. In addition, the notification method of the operation report 900 may change according to the importance of the details, for example.

The operation report 900 includes an operation ratio and a deterioration degree of the robot 10, the number of automatic changes (AUTOMATICALLY-RESCHEDULED TIMES) indicating the number of times the registered schedule is automatically changed by the schedule management server 50, the number of manual changes (MANUALLY-RESCHEDULED TIMES) indicating the number of times the registered schedule is manually changed by the administrator, and the number of times the schedule is failed to be automatically set (SCHEDULE AUTOMATICALLY-SETTING FAILING TIMES) indicating the number of times the schedule is failed to be set by the processing of the schedule management server 50. In addition, the operation report 900 includes information on a proposal for improvement for the administrator, for example, with respect to an environment of the site or an operation state of the robot 10, which is determined by the schedule management server 50 based on the schedules in the past or the execution status of each task. In the example of FIG. 28, the proposal for improvement indicates to prompt to change the position P0 of the charging station in the site. The content of the operation report 900 is not limited thereto, and may include information such as the result of other schedule processing or another operation state of the robot 10, which is preferably notified to the administrator.

As described above, the scheduling system 1 according to the present embodiment registers an executable schedule for the robot 10, which is to execute the inspection tasks specified or designated by the administrator, based on the estimated amount of battery consumption in executing the inspection tasks. In addition, even in a case where there are an inspection task having a start time and another inspection task having no start time, the scheduling system 1 according to the present embodiment causes the robot 10 to efficiently execute the inspection tasks specified or designated by the administrator by automatically generating and registering an execution schedule for the robot 10 installed in the target site.

As described above, a scheduling system according to one of the present embodiment of the present disclosure is the scheduling system 1 that generates a schedule in which a plurality of tasks to be executed by the robot 10 (an example of a mobile device) is arranged. The scheduling system 1 includes the task information management DB 5002 (an example of a storing unit) that stores information on an estimated amount of battery consumption of the robot 10 in executing each inspection task. The scheduling system 1 includes the reception unit 72 (an example of a receiving unit) to receive designation of the plurality of tasks to be executed by the robot 10. The scheduling system 1 includes the display control unit 73 (an example of a displaying unit) to cause the display 706 (an example of a display unit) to display the schedule checking screen 800 (an example of a display screen) having a schedule in which the plurality of tasks is arranged for the robot 10 based on the information on the estimated amount of battery consumption. Accordingly, the scheduling system 1 performs scheduling for causing the robot 10 to execute the specified inspection tasks.

In addition, the scheduling system according to one of the embodiments of the present disclosure includes the registration unit 58 (an example of a registering unit) that registers a schedule to which a plurality of inspection tasks are arranged based on an amount of battery consumption corresponding to the plurality of specified inspection tasks (an example of tasks). Accordingly, the scheduling system 1 performs scheduling for causing the robot 10 to execute the specified inspection tasks.

In addition, the scheduling system according to one of the embodiments of the present disclosure includes the generating unit 54 (an example of a generating unit) to generate a plurality of arrangement patterns (an example of patterns) in each of which the plurality of tasks is arranged. The scheduling system includes the identifying unit 56 (an example of an identifying unit) to identify one of the plurality of arrangement patterns generated, based on an estimated amount of battery consumption corresponding to the plurality of inspection tasks, and then registers the schedule indicated by the identified arrangement pattern. Accordingly, the scheduling system 1 generates and registers the schedule in which all the specified inspection tasks are arranged to be efficiently executed by the robot 10.

In addition, in the scheduling system according to one of the embodiments of the present disclosure, arrangement patterns (an example of patterns) in each of which an inspection task having a start time among the plurality of specified inspection tasks (an example of tasks) is preferentially arranged are generated. Accordingly, the scheduling system 1 automatically generates an execution schedule for the robot 10 in the target site, even when there are an inspection task having a start time and an inspection task having no start time.

In addition, the scheduling system according to one of the embodiments of the present disclosure identifies an arrangement pattern in which a final amount of battery remaining at a time after the plurality of specified inspection tasks (an example of tasks) are completely executed is larger than the threshold value X (an example of a first threshold) among the plurality of generated arrangement patterns (an example of patterns). In addition, the scheduling system 1 identifies, from among the plurality of generated arrangement patterns, an arrangement pattern in which an estimated amount of battery remaining in executing the plurality of specified inspection tasks is greater than the threshold value X. Accordingly, the scheduling system 1 prevents the robot 10 from failing to execute the inspection tasks in the middle of the schedule.

In addition, the scheduling system according to one of the embodiments of the present disclosure receives a setting of priority of specific conditions for identifying an arrangement pattern (an example of a pattern), and identifies one arrangement pattern from the plurality of generated arrangement patterns using the set priority. Accordingly, the scheduling system 1 identifies the arrangement pattern according to the priority set for performing the schedule registration, and thus the schedule that satisfies the request from an administrator is successfully registered.

With a conventional method, when tasks are to be executed by a mobile device such as a robot that operates with power supply from a battery, arranging a schedule by taking account an amount of battery remaining of the mobile device in order to surely execute all specified tasks is difficult.

According to one or more embodiments, a schedule is arranged such that specified tasks arranged in the schedule are surely executed by a mobile device.

Each of the functions of the above-described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

Each of the tables of the above-described embodiments may be generated by learning effect of machine learning. In addition, in alternative to using the tables, the data of each related item may be classified by the machine learning. In the present disclosure, the machine learning is defined as a technology that makes a computer to acquire human-like learning ability. In addition, the machine learning refers to a technology in which a computer autonomously generates an algorithm required for determination such as data identification from learning data loaded in advance and applies the generated algorithm to new data to make a prediction. Any suitable learning method is applied for the machine learning, for example, any one of supervised learning, unsupervised learning, semi-supervised learning, reinforcement learning, and deep learning, or a combination of two or more of these learning.

Although the scheduling system, the scheduling method, and the program according to one or more embodiments of the present disclosure are described above, the above-described embodiments are illustrative and do not limit the present disclosure. The above-described embodiments of the present disclosure may be modified within a range that can be conceived by those skilled in the art. The modification includes additions of other embodiments, modifications, and deletions. The modifications are included in the scope of the present disclosure as long as the actions and effects of the present disclosure are provided.

Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

The present disclosure may be implemented in any convenient form, for example using dedicated hardware, or a mixture of dedicated hardware and software. The present disclosure may be implemented as computer software implemented by one or more networked processing apparatuses. The processing apparatuses can comprise any suitably programmed apparatuses such as a general purpose computer, personal digital assistant, mobile telephone (such as a Wireless Application Protocol (WAP) or 3G-compliant phone) and so on. Since the present disclosure can be implemented as software, each and every aspect of the present disclosure thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a CPU, a RAM, and an HDD. The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The invention claimed is:

1. An execution system, comprising:
    at least one robot placed in a predetermined site, each robot including:
        a drive motor for driving the robot; and
        an imaging device;
    a server configured to store, in a memory, information on a plurality of tasks to be executed by the at least one robot, the information on the plurality of tasks including information on an estimated amount of battery consumption of the at least one robot in executing each of the plurality of tasks; and
    a communication terminal configured to
        receive designation of the plurality of tasks to be executed by the at least one robot, and
        cause a display to display an execution schedule on a screen, the execution schedule being for executing, by the at least one robot, the plurality of tasks and being based on the information on the estimated amount of battery consumption of the at least one robot to reduce the total battery consumption of the at least one robot, wherein the server is further configured to cause the at least one robot to execute the plurality of tasks in accordance with the execution schedule by autonomously moving within the predetermined site, and the plurality of tasks are inspection tasks for imaging target objects, by the imaging device, in the predetermined site.

2. The executions system of claim 1, wherein the server is further configured to store, in the memory, the execution schedule based on the information on the estimated amount of battery consumption.

3. The executions system of claim 2, wherein the server is further configured to:

store, in the memory, one of a plurality of patterns in each of which the plurality of task is arranged as the execution schedule, wherein the plurality of patterns is based on the information on the estimated amount of battery consumption.

4. The execution system of claim 3, wherein the plurality of tasks includes one or more first tasks to each of which an execution start time is preset and one or more second tasks that are other than the one or more first tasks, and wherein the plurality of patterns in each of the one or more first tasks and the one or more second tasks are based on a priority.

5. The execution system of claim 3, wherein the one of the plurality of patterns satisfies a condition in which a final amount of battery remaining is greater than a threshold value, the final amount of battery remaining being an amount of battery remaining of the at least one robot after the plurality of tasks are completely executed.

6. The execution system of claim 3, wherein the one of the plurality of patterns satisfies another condition in which an estimated amount of battery remaining is greater than a threshold value, the estimated amount of battery remaining being an amount of battery remaining of the at least one robot for executing each of the plurality of tasks.

7. The execution system of claim 3, wherein the one of the plurality of patterns has an earliest end time among the plurality of patterns, the earliest end time being a time at which the plurality of tasks are completely executed.

8. The execution system of claim 3, wherein the one of the plurality of patterns has a minimum amount of movement of the at least one robot to execute the plurality of tasks among the plurality of patterns.

9. The execution system of claim 3, wherein the at least one robot includes a plurality of robots, and each of the plurality of robots is assigned with one or more of the plurality of tasks in each of the plurality of patterns.

10. The execution system of claim 9, wherein the identified one of the plurality of patterns has a minimum number of replacement times among the plurality of patterns, the minimum number of replacement times being a minimum number of times to replace one of the plurality of robots with another one of the plurality of robots during execution of the execution schedule.

11. The execution system of claim 3, wherein the communication terminal further receives a setting of priority of specific conditions, the one of the plurality of patterns being based at least on the setting of priority.

12. The execution system of claim 2, wherein the server is further configured to reschedule the execution schedule in response to a condition in which an estimated final amount of battery remaining is equal to or less than a threshold value, the estimated final amount of battery remaining being an amount of battery remaining of the at least one robot after the plurality of tasks are completely executed and estimated in a middle of executing the plurality of tasks.

13. The execution system of claim 2, wherein a rescheduling of the execution schedule occurs in response to at least one abnormality occurring in the at least one robot during execution of the plurality of tasks.

14. The execution system of claim 1, wherein the screen having the execution schedule displayed by the display includes a map image indicating a current position of the at least one robot within the predetermined site.

15. The execution system of claim 1, wherein the screen having the execution schedule displayed by the display includes an image captured by the imaging device of at least one robot and reflecting a current position of the at least one robot.

16. A method, comprising:

receiving, by a communication terminal, designation of a plurality of tasks to be executed by at least one robot, wherein information on an estimated amount of battery consumption in executing each of the plurality of tasks is stored in a memory;

displaying, by a communication terminal, an execution schedule on a screen, the execution schedule being for executing, by the at least one robot, the plurality of tasks and being based on the information on the estimated amount of battery consumption of the at least one robot to reduce the total battery consumption of the at least one robot; and causing, by a server, the at least one robot to execute the plurality of tasks of the at least one robot in accordance with the execution schedule by autonomously moving within a site, wherein the plurality of tasks are inspection tasks for imaging target objects, by an imaging device of the at least one robot, in the predetermined site.

17. A non-transitory recording medium storing a plurality of instructions which, when executed by one or more processors, causes the one or more processors to perform a method, the method comprising:

receiving designation of a plurality of tasks to be executed by at least one robot, wherein information on an estimated amount of battery consumption in executing each of the plurality of tasks is stored in a memory;

displaying an execution schedule on a screen, the execution schedule being for executing, by the at least one robot, the plurality of tasks and being based on the information on the estimated amount of battery consumption of the at least one robot to reduce the total battery consumption of the at least one robot; and causing the at least one robot to execute the plurality of tasks of the at least one robot in accordance with the execution schedule by autonomously moving within a predetermined site, wherein the plurality of tasks are inspection tasks for imaging target objects, by an imaging device of the at least one robot, in the predetermined site.

* * * * *